US012547316B2

(12) United States Patent
Cariello

(10) Patent No.: US 12,547,316 B2
(45) Date of Patent: Feb. 10, 2026

(54) MULTI-PLANE CACHE TRANSFER ENHANCEMENT

(71) Applicant: Micron Technology, Inc., Boise, ID (US)

(72) Inventor: Giuseppe Cariello, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/949,612

(22) Filed: Nov. 15, 2024

(65) Prior Publication Data
US 2025/0181248 A1 Jun. 5, 2025

Related U.S. Application Data

(60) Provisional application No. 63/604,710, filed on Nov. 30, 2023.

(51) Int. Cl.
G06F 3/06 (2006.01)
(52) U.S. Cl.
CPC .......... G06F 3/0613 (2013.01); G06F 3/0635 (2013.01); G06F 3/0679 (2013.01)

(58) Field of Classification Search
CPC .... G06F 3/0613; G06F 3/0635; G06F 3/0679; G06F 12/0882
See application file for complete search history.

(56) References Cited

U.S. PATENT DOCUMENTS

| 2015/0199140 A1* | 7/2015 | Chen | G06F 3/0659 711/103 |
| 2020/0356307 A1* | 11/2020 | Subbarao | G11C 16/10 |
| 2022/0044724 A1* | 2/2022 | Jeong | G11C 16/26 |
| 2022/0179573 A1* | 6/2022 | Kim | G06F 3/0604 |

* cited by examiner

Primary Examiner — Hiep T Nguyen
(74) Attorney, Agent, or Firm — Holland & Hart LLP

(57) ABSTRACT

Methods, systems, and devices for multi-plane cache transfer enhancement are described. Portions of a page associated with different subsets of planes may be transferred between subsets of latches at offsetting times such that a portion of a page may be transferred concurrent with a portion of another page being received or transmitted. For a write operation, a portion of a page may be transferred from a gateway latch to a buffer latch concurrent with another portion of a page being externally received. For a read operation, a portion of a page may be transferred from a buffer latch to a gateway latch concurrent with another portion of a page being externally transmitted. This may allow the external receipt and transmission of pages to be performed with no delay between the pages.

29 Claims, 11 Drawing Sheets

MULTI-PLANE CACHE TRANSFER ENHANCEMENT

CROSS REFERENCE

The present application for patent claims priority to U.S. Patent Application No. 63/604,710 by Cariello, entitled "MULTI-PLANE CACHE TRANSFER ENHANCEMENT," filed Nov. 30, 2023, which is assigned to the assignee hereof, and which is expressly incorporated by reference herein.

TECHNICAL FIELD

The following relates to one or more systems for memory, including multi-plane cache transfer enhancement.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
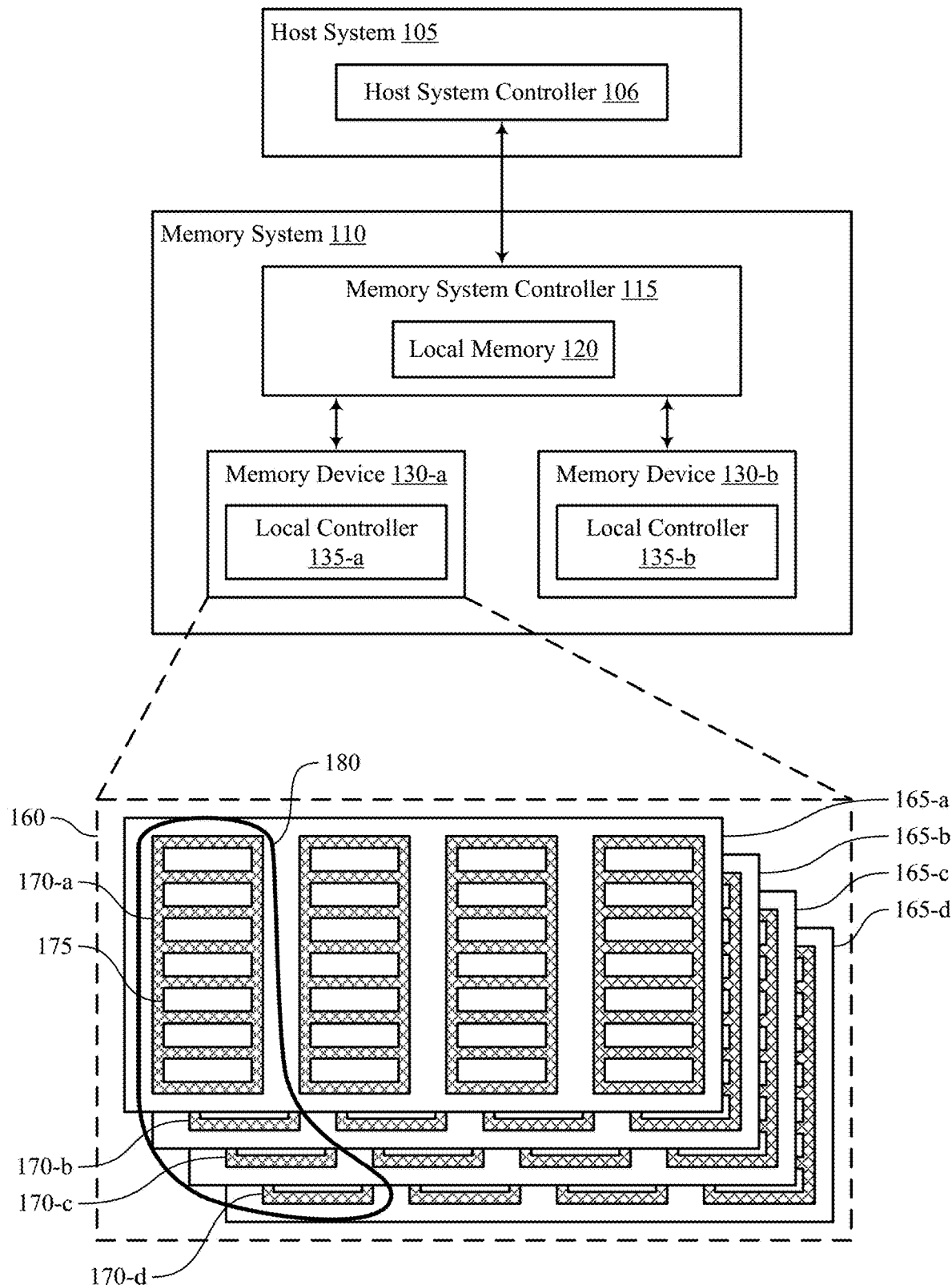
FIG. 1 shows an example of a system that supports multi-plane cache transfer enhancement in accordance with examples as disclosed herein.

Memory devices may use latches for reading and writing of data. For example, a memory device may include at least two types of latches: gateway latches for passing data externally (e.g., to and from a memory system controller), and buffer latches for passing data internally (e.g., to and from a memory array) on the memory device. The memory may be associated with different planes and the gateway latches and buffer latches may be associated with the various planes. In cases involving cache transfers, data may be transferred between the two types of latches before being saved or transmitted. The transferring of data associated with a page between gateway latches and buffer latches may take a particular amount of time (a delay time) to complete. The delay time may include, e.g., time for the data to settle, time to perform the latching of the data, etc., and may be in an order of about 2 microseconds or more.

In current memory systems, a wait time may be introduced between the transmission of each page of data to take into account the delay time and make sure the internal transfer of the page is completed between the latches. This delay time may be compounded during multiple plane operations. For purposes of this application, a multi-plane operation may be defined as a memory operation (e.g., a memory read or write) associated with multiple planes of memory. A page of data associated with a multi-plane operation may be referred to herein as a multi-plane page or a page. The page may comprise portions of data associated with each plane of the operation, which may be referred to herein as an associated page of the plane. For example, for a multi-plane page of data associated with a two-plane operation, a portion of the page may be associated with one of the planes (e.g., an associated page of the plane) and another portion of the page may be associated with the other plane (e.g., an associated page of the other plane). Reducing or eliminating the wait time between multi-plane pages would allow for faster data transfers and higher throughput, especially in multi-plane operations.

Techniques are described for multi-plane cache transfer enhancement. In some examples, portions of each multi-plane page of data may be transferred between subsets of latches at offsetting times such that a portion of a page may be transferred concurrent with a portion of another page being received or transmitted externally (e.g., from a memory system controller). This may result in the transfer of data between latches being completed (including with the wait time) during the receipt or transmission externally of other data. In many cases, this may allow the receipt or transmission of the pages to be performed with no delay between the pages, as discussed herein.

During a write operation, a portion of a multi-plane page associated with a subset of planes may be transferred from a subset of gateway latches to a subset of buffer latches concurrent with a portion of a multi-plane page (the same page or a next page) associated with a different subset of planes being received externally (e.g., from a memory system controller) and stored in a different subset of gateway latches. For example, a first portion of a multi-plane page may be transferred from a first subset of gateway latches to a first subset of buffer latches concurrent with a second portion of the page being received from a memory system controller and stored in a second subset of gateway latches.

Similarly, a second portion of a multi-plane page may be transferred from a second subset of gateway latches to a second subset of buffer latches concurrent with a first portion of a next page being received from the memory system controller and stored in a first subset of gateway latches.

By transferring the portions of the multi-plane pages at different times, the wait time associated with the transfer between subsets of gateway and buffer latches may occur while the other subset of gateway latches are externally receiving data. This may result in the transfer of the portion of the page from the subset of gateway latches to the subset of buffer latches being completed before the other portion of the page has been completely received in the other subset of gateway latches. As a result, the subset of gateway latches may become free to receive the next page (or portion thereof) without delay. Thus, the wait time associated with the transfer of data between the latches may not delay the receipt of further data pages during a write operation. That is, the external pages may be received with no delay between the pages.

During a read operation, a portion of a multi-plane page associated with a subset of planes may be transferred from a subset of buffer latches to a subset of gateway latches concurrent with a portion of a multi-plane page (the same page or a prior page) associated with a different subset of planes being transmitted externally (e.g., to a memory system controller) from a different subset of gateway latches. For example, concurrent with a first portion of a multi-plane page being transmitted from a first subset of gateway latches to a memory system controller, a second portion of the page may be transferred from a second subset of buffer latches to a second subset of gateway latches. Similarly, concurrent with a second portion of a multi-plane page being transmitted from a second subset of gateway latches to a memory system controller, a first portion of the next page may be transferred from a first subset of buffer latches to a first subset of gateway latches.

By transferring the portions of the multi-plane pages at different times, the wait time associated with the transfer between subsets of buffer and gateway latches may occur while the other subset of gateway latches are externally transmitting data. This may result in the transfer of the portion of the page from the subset of buffer latches to the subset of gateway latches being completed before the prior portion of the page has been completely transmitted from the other subset of gateway latches. As a result, the portion of the page in the subset of gateway latches is ready for transmitting immediately after the prior portion has been transmitted from the other subset of gateway latches. Thus, the wait time associated with the transfer of data between the latches may not delay the transmitting externally of further data pages during a read operation. That is, the pages may be transmitted externally with no delay between the pages.

Figure 2:
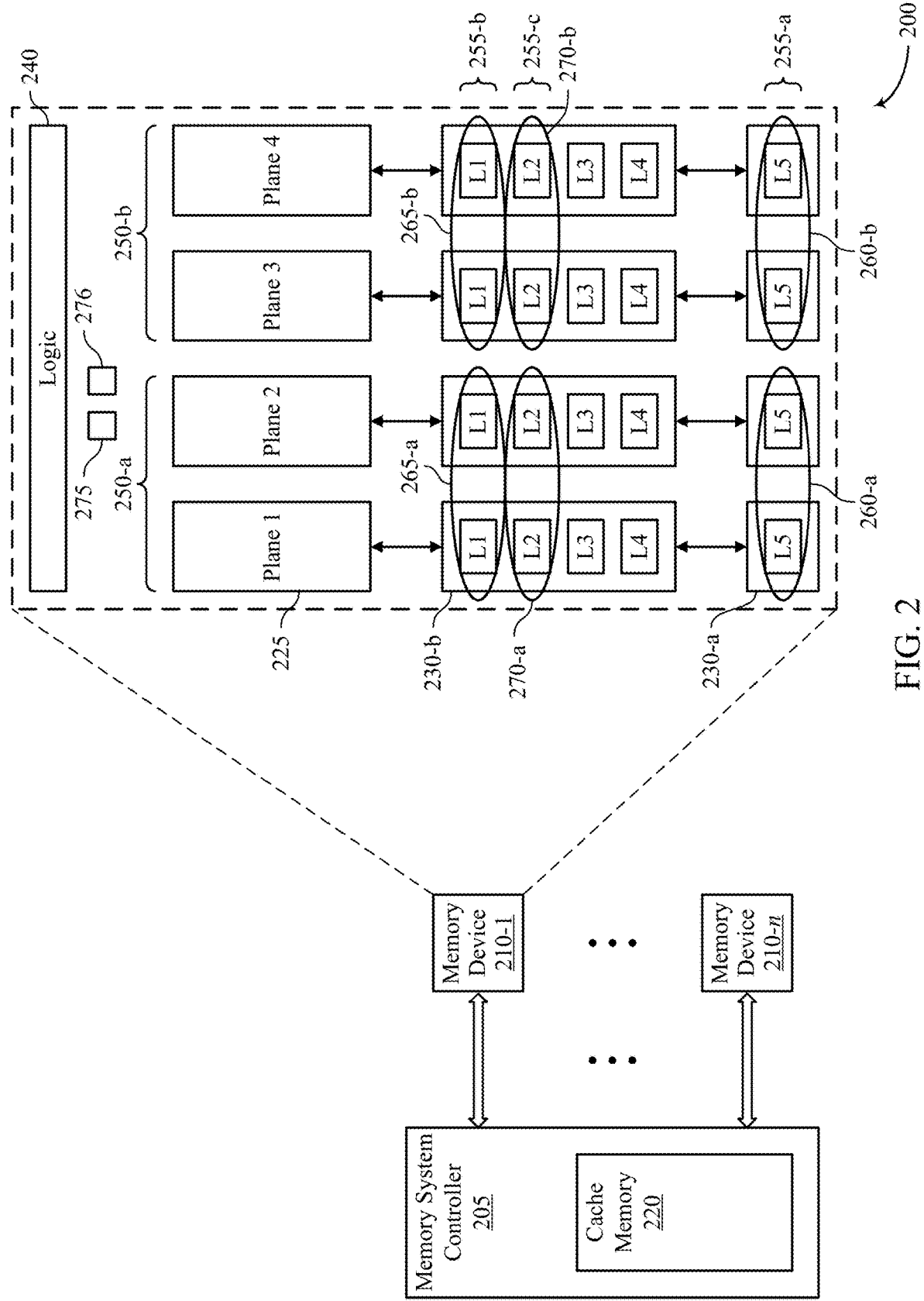
FIG. 2 shows an example of a system that supports multi-plane cache transfer enhancement in accordance with examples as disclosed herein.

Features of the disclosure are initially described in the context of systems, devices, and circuits with reference to FIGS. 1 and 2. Features of the disclosure are further described in the context of timing diagrams with reference to FIGS. 3 and 4. These and other features of the disclosure are further illustrated by and described in the context of apparatus diagrams and flowcharts that relate to multi-plane cache transfer enhancement with reference to FIGS. 5 through 10.

FIG. 1 shows an example of a system 100 that supports multi-plane cache transfer enhancement in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy. Further, data received by the memory system controller 115 from the memory devices 130 or data to be written to the memory devices 130 may be temporarily stored in the local memory 120 while verification and error control of the data is performed on it.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs).

Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support multi-plane cache transfer enhancement. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In addition to applicability in memory systems as described herein, techniques for multi-plane cache transfer enhancement may be generally implemented to support increased connectivity of electronic systems. As the use of systems relying on interconnected electronic devices increases, the connectivity of these electronic devices becomes an increasingly relevant factor for the operations of the system. For example, delays associated with signals communicated between devices may become increasingly relevant as critical systems come to rely more on connectivity, as a system uses larger quantities of interconnected devices, or if the quantity and the complexity of signals communicated between devices increases. Implementing the techniques described herein may support techniques for increased connectivity in electronic systems by improving data transfer between devices, among other benefits.

FIG. 2 shows an example of a memory system 200 that supports multi-plane cache transfer enhancement in accordance with examples as disclosed herein. The memory system 200 may be an example of a memory system 110 as described with reference to FIG. 1, or aspects thereof. The memory system 200 may include a memory system controller 205 coupled with one or more memory devices 210 (e.g., memory device 210-1 through 210-*n*) over one or more communication channels (e.g., one or more ONFI channels). The memory system controller 205 may have a cache memory 220, e.g., for temporarily storing data transferred between the host system and the memory devices 210. Memory system controller 205 may be an example of memory system controller 115 discussed with respect to FIG. 1. Cache memory 220 may be an example of or included in local memory 120 discussed with respect to FIG. 1.

The memory devices 210 may be examples of the memory devices 130 discussed with respect to FIG. 1. The memory system 200 may improve performance (e.g., speed and throughput) associated with reading and writing data to multiple planes. For a write operation, the timing of transferring data from gateway to buffer latches associated with a subset of the planes may be offset with the timing of transferring data from gateway to buffer latches associated with another subset of the planes so that data associated with one subset of planes may be transferred between the latches concurrent with external data being received and stored into gateway latches associated with the other subset of planes. This may allow for external pages to be received with no delay between the pages.

For a read operation, the timing of transferring data from buffer to gateway latches associated with a subset of the planes may be offset with the timing of transferring data from buffer to gateway latches associated with another subset of the planes so that data associated with one subset of planes may be transferred between the latches concurrent with data being externally transmitted from gateway latches associated with the other subset of planes. This may allow for pages to be externally transmitted with no delay between the pages.

The memory system 200 may be configured to store data received from a host system and to send data to the host system, in response to a request by the host system using access commands (e.g., read commands or write commands). Memory system controller 205 may execute commands (e.g., access commands) received from the host system and control the movement of information (e.g., data, address mapping information) within the memory system 200. For example, memory system controller 205 may manage the transfer of information to and from the memory devices 210, e.g., for storing information, retrieving information, and determining memory locations in which to store information and from which to retrieve information.

The memory devices 210 may store data transferred between the memory system 200 and the host system, e.g., in response to receiving access commands from the host system. A memory device 210 may include N planes 225 (e.g., four planes, denoted plane 1 through plane 4 in the depicted example). The planes 225 may be organized into subsets that may be used independent of each other for reading and writing sets of data, as discussed herein. One or more of the planes may together form a first subset of planes and one or more other planes may together form a second subset of planes. For example, in the depicted example, planes 1 and 2 may form a first subset of planes 250-a and planes 3 and 4 may form a second subset of planes 250-b. The first and second subset of planes may be disjoint subsets. In some examples, each subset of planes may include at least two planes. In some examples, the subsets may have the same number of planes. In some examples, one of the subsets of planes may include a single plane. For example, the first subset of planes 250-a may include a single plane (e.g., plane 1) and the second subset of planes 250-b may include three planes (e.g., planes 2-4).

Each plane 225 may have one or more associated latches 230 (denoted L1 through L5 in the depicted embodiment). The latches 230 may facilitate access operations (e.g., read operations, write operations) by temporarily storing data involved in the access operations. Each of the latches 230 may include multiple latch circuits, each capable of storing a single bit, such that each of the latches 230 may store a quantity of bits corresponding to a page of the corresponding plane 225. The latch circuits may be implemented in the memory device as either level-triggered (e.g., transparent latches) or edge-triggered (e.g., flip-flops). Although described as having five latches 230 associated with each plane, some memory devices may have fewer or more latches 230 associated with a plane. In some cases, each memory device 210 may include m+1 latches 230 associated with a plane, where m may represent a quantity of bits stored in a memory cell at a highest supported density (e.g., highest quantity of bits stored in each of the multiple-level memory cells). For example, for a plane 225 having QLC memory cells, there may be five latches, and for a plane 225 having TLC memory cells, there may be four latches.

In some examples, one or more of the latches 230 associated with a plane 225 (e.g., latch L5), may serve as a gateway latch 230-a for passing data to and from memory system controller 205. In some examples, one or more of the latches 230 associated with the plane (e.g., one or more of latches L1-L4) may each serve as a buffer latch 230-b for passing data to and from the memory cells of the plane. In some examples, the gateway latch 230-a and the buffer latches 230-b may be coupled so that data sent to or received from memory system controller is routed through the gateway latch 230-a and a buffer latch 230-b.

Data transferred from the memory system controller 205 to the memory cells associated with a plane 225 (e.g., as part of a write command) may be routed, in order, through a gateway latch 230-a and a buffer latch 230-b associated with the plane before being written to the memory cells of the plane. Conversely, data transferred from the memory cells of a plane 225 to the memory system controller 205 (e.g., as part of a read command) may be routed, in order, through a buffer latch 230-b and a gateway latch 230-a before being transmitted to the memory system controller 205.

The latches 230 associated with the planes 225 may be organized into sets of latches 255. For example, latches L5 of all of the planes 225 may together comprise a set of latches 255-a, latches L1 of all of the planes 225 may together comprise another set of latches 255-b, latches L2 of all of the planes 225 may together comprise another set of latches 255-c, and so forth.

Each set of latches 255 may be further organized into subsets, based on the respective subset of planes 250 associated with each latch. For example, each of the set of latches 255-a associated with the first subset of planes 250-a may comprise a first subset 260-a of the set of latches 255-a (e.g., latches L5 associated with planes 1 and 2) and each of the set of latches 255-a associated with the second subset of planes 250-b may comprise a second subset 260-b of the set of latches 255-a (e.g., latches L5 associated with planes 3 and 4). Similarly, each of the set of latches 255-b associated with the first subset of planes 250-a may comprise a first subset 265-a of the set of latches 255-b (e.g., latches L1 associated with planes 1 and 2) and each of the set of latches 255-b associated with the second subset of planes 250-b may comprise a second subset 265-b of the set of latches 255-b (e.g., latches L1 associated with planes 3 and 4).

In some examples, as disclosed herein, during write and read operations involving multiple multi-level cell pages and multiple planes of a memory device, portions of the pages may be transferred between the subsets 260, 265, 270 of the sets of latches 255 at different times (e.g., offset from each other) to move the pages between the memory system controller 205 and the memory with reduced delay between the pages.

During write and read operations of pages associated with multiple planes, the portions of the pages associated with each plane may be received or transmitted a plane at a time. For example, during a write operation, the portion of the page associated with a first plane may be transmitted to the memory system controller before the portion associated with the second plane, and so forth.

In some examples, the memory device 210 may include logic 240 for determining which planes and subset of planes to use during different portions of write and read operations. In some examples, the logic 240 may track the planes 225 and subset of planes 250 as they are used (e.g., using write indicator 275 and read indicator 276) and may determine when to change the plane 225 and subset of planes 250 during the operations, based thereon. For example, during a write operation, upon receiving a command to change or advance planes from memory system controller 205, the logic 240 may determine that the first subset of planes 250-*a* is currently being used for receiving data from the memory system controller and may determine to change to the second subset of planes 250-*b* for receiving the data, e.g., based on the next plane being associated with the second subset of planes. The logic 240 may also determine which gateway and buffer latches should be used for transferring data and when the data should be transferred, based on the tracking of the planes and subset of planes, as discussed herein. In some examples, the logic 240 may determine to transfer the data based on the commands received from the memory system controller. For example, a command received from the memory system controller may indicate to transfer data in addition to changing planes.

In some examples, the logic 240 may determine which planes and subset of planes to use based on the commands received from the memory system controller. For example, a specific command received from the memory system controller may indicate the subset of planes to use for transmitting or receiving the data.

When writing data to multi-level cells, such as MLCs, TLCs, or QLCs, on multiple planes, more than one page of data may be received and stored in different buffer latches 230-*b* before the pages are programmed to the multi-level cells. For example the pages may include a lower page (LP), an upper page (UP), and an extra page (XP) of a TLC memory operation or a combination thereof. Each page may be transmitted between the memory system controller 205 and the memory device 210 a plane at a time, and multiple pages may be transmitted in succession. In some examples, a wait time may be avoided between pages by transferring a portion of a page between latches associated with a subset of planes concurrent with externally receiving or transmitting a portion of a page associated with another subset of planes.

For write (e.g., program) operations, the memory device 210 may receive data into the gateway latches 230-*a* from the memory system controller 205 associated with each page (e.g., an LP, a UP, an XP, or a combination thereof) of the write operation, a plane at a time. The memory device 210 may transfer the received data from the gateway latches 230-*a* to the buffer latches 230-*b* for temporary storage until the data may be programmed to the planes.

The transferring of data from the gateway latches 230-*a* to the buffer latches 230-*b* may be offset between the different subsets of planes 250. For example, a portion of a first page of data (e.g., a first set of data) associated with the first subset of planes 250-*a* may be transferred from a first subset of a set of gateway latches 230-*a* (e.g., the first subset 260-*a* of latches L5) to a first subset of a set of buffer latches 230-*b* (e.g., the first subset 265-*a* of latches L1) at a time that is offset from the transferring of another portion of the first page of data (e.g., a second set of data) associated with the second subset of planes 250-*b* from a second subset of the set of gateway latches 230-*a* (e.g., the second subset 260-*b* of latches L5) to a second subset of the set of buffer latches 230-*b* (e.g., the second subset 265-*b* of latches L1). This offsetting may allow the set of data associated with a subset of planes to be transferred to the buffer latches 230-*b* concurrent with the set of data associated with the other subset of planes being received into the gateway latches 230-*a* from the memory system controller, ameliorating the wait time, as further discussed herein.

In some examples, a write indicator 275 may indicate which subset of planes to associate with the next set of data received from the memory system controller. The logic 240 may direct that the gateway latches 230-*a* and buffer latches 230-*b* associated with the indicated subset of planes are used for the set of data. For example, if the write indicator 275 indicates the first subset of planes 250-*a*, the next set of data received from the memory system controller may be loaded into a subset of gateway latches associated with the first subset of planes and may be subsequently transferred to a subset of buffer latches associated with the first subset of planes; and if the write indicator 275 indicates the second subset of planes 250-*b*, the next set of data received from the memory system controller may be loaded into a subset of gateway latches associated with the second subset of planes and may be subsequently transferred to a subset of buffer latches associated with the second subset of planes.

In some examples, the write indicator 275 may be maintained by the memory device. For example, the write indicator 275 may be set by the logic 240 to indicate the first set of planes or the second set of planes, e.g., based at least in part on receiving a write command or a change plane command from the memory system controller. In some examples, the write indicator 275 may be changed by the memory device after loading a set of data into a subset of latches. For example, the write indicator 275 may be changed by the logic 240 to indicate (i) the second subset of planes 250-*b* after loading the first set of data into a first subset of gateway latches 230-*a*, or (ii) the first subset of planes 250-*a* after loading the second set of data into a second subset of gateway latches 230-*b*.

In some examples, the write indicator 275 may be changed based on receiving a command (e.g., a command to advance planes (e.g., an opcode 11h in ONFI) or to change planes (e.g., a command to switch planes (e.g., an opcode 15h in ONFI)) from the memory system controller.

In some examples, the memory device may determine which subset of planes to associate with the set of data based on an indication received from the memory system controller. For example, an indication may be sent by the memory system controller in conjunction with a set of data indicating the first or second subset of planes to associate with the set of data. For example, a write command may include a field (e.g., one or more bits) having a value signifying the first set of planes and another value signifying the second set of planes. In some examples, the memory device may determine when to transfer data between latches based on an indication received from the memory system controller. In some examples, the commands themselves may be the indications. For example, one type of command (e.g., an opcode 13h in ONFI) may be used to change planes and trigger a data transfer from gateway latches to buffer latches associated with the first subset of planes and another type of command (e.g., an opcode 17h in ONFI) may be used to change planes and trigger a data transfer from gateway latches to buffer latches associated with the second subset of planes. The logic 240 may determine which subset to use and when to trigger the data transfer based on these indications.

For read operations, the memory device may read data from the planes 225 into buffer latches 230-*b*. The memory device may transfer the data from the buffer latches 230-*b* to gateway latches 230-*a* for temporary storage until the data may be transmitted to the memory system controller, a plane at a time.

The transferring of data from the buffer latches 230-*b* to the gateway latches 230-*a* may be offset between the different subsets of planes 250. For example, a portion of a first page of data (e.g., a first set of data) associated with the first subset of planes 250-*a* may be transferred from a first subset of a set of buffer latches 230-*b* (e.g., the first subset 265-*a* of latches L1) to a first subset of a set of gateway latches 230-*a* (e.g., the first subset 260-*a* of latches L5) at a time that is offset from the transferring of another portion of the first page of data (e.g., a second set of data) associated with the second subset of planes 250-*b* from a second subset of the set of buffer latches 230-*b* (e.g., the second subset 265-*a* of latches L1) to a second subset of the set of gateway latches 230-*a* (e.g., the second subset 260-*b* of latches L5). This offsetting may allow the set of data associated with a subset of planes to be transferred to the gateway latches 230-*a* concurrent with the set of data associated with the other subset of planes being read into the buffer latches 230-*b*, ameliorating the wait time, as further discussed herein.

In some examples, a read indicator 276 may indicate which subset of planes to associate with the data to transmit to the memory system controller. The logic 240 may direct that the data is transferred from the buffer latches 230-*b* to the gateway latches 230-*a* associated with the indicated planes for transmitting to the memory system controller. For example, if the read indicator 276 indicates the first subset of planes 250-*a*, data stored in a subset of buffer latches associated with the first subset of planes may be transferred to a subset of gateway latches associated with the first subset of planes; and if the read indicator 276 indicates the second subset of planes 250-*b*, data stored in a subset of buffer latches associated with the second subset of planes may be transferred to a subset of gateway latches associated with the second subset of planes.

In some examples, the read indicator 276 may be maintained by the memory device. For example, the read indicator 276 may be set by the logic 240 to indicate the first subset of planes or the second subset of planes, e.g., based at least in part on receiving a read command or a change plane command from the memory system controller. In some examples, the read indicator 276 may be changed by the logic 240 after data associated with each subset of planes has been transmitted to the memory system controller. In some examples, the read indicator 276 may be changed by the logic 240 after a set of data is transferred to a subset of the gateway latches 230-*a*.

In some examples, the read indicator 276 may be changed based on receiving a command associated with a read (e.g., an opcode 31h in ONFI to perform a read operation or an opcode 06h in ONFI to advance planes) from the memory system controller.

In some examples, the memory device may determine which subset of planes to use based on an indication received from the memory system controller. For example, an indication may be sent by the memory system controller in conjunction with a read command indicating the first or second subset of planes to use for the set of data. For example, a read command may include a field (e.g., one or more bits) having a value signifying the first set of planes and another value signifying the second set of planes. In some examples, the memory device may determine when to transfer data between latches based on an indication received from the memory system controller. In some examples, the commands themselves may be the indications. For example, one type of command (e.g., an opcode 1Ah in ONFI) may be used to change planes and trigger a data transfer from buffer latches to gateway latches associated with the first subset of planes and another type of command (e.g., an opcode 1Bh in ONFI) may be used to change planes and trigger a data transfer from buffer latches to gateway latches associated with the second subset of planes. The logic 240 may determine which subset to use and when to trigger the data transfer based on these indications.

In some examples, the write indicator 275 and the read indicator 276 may be a same indicator.

Figure 3:
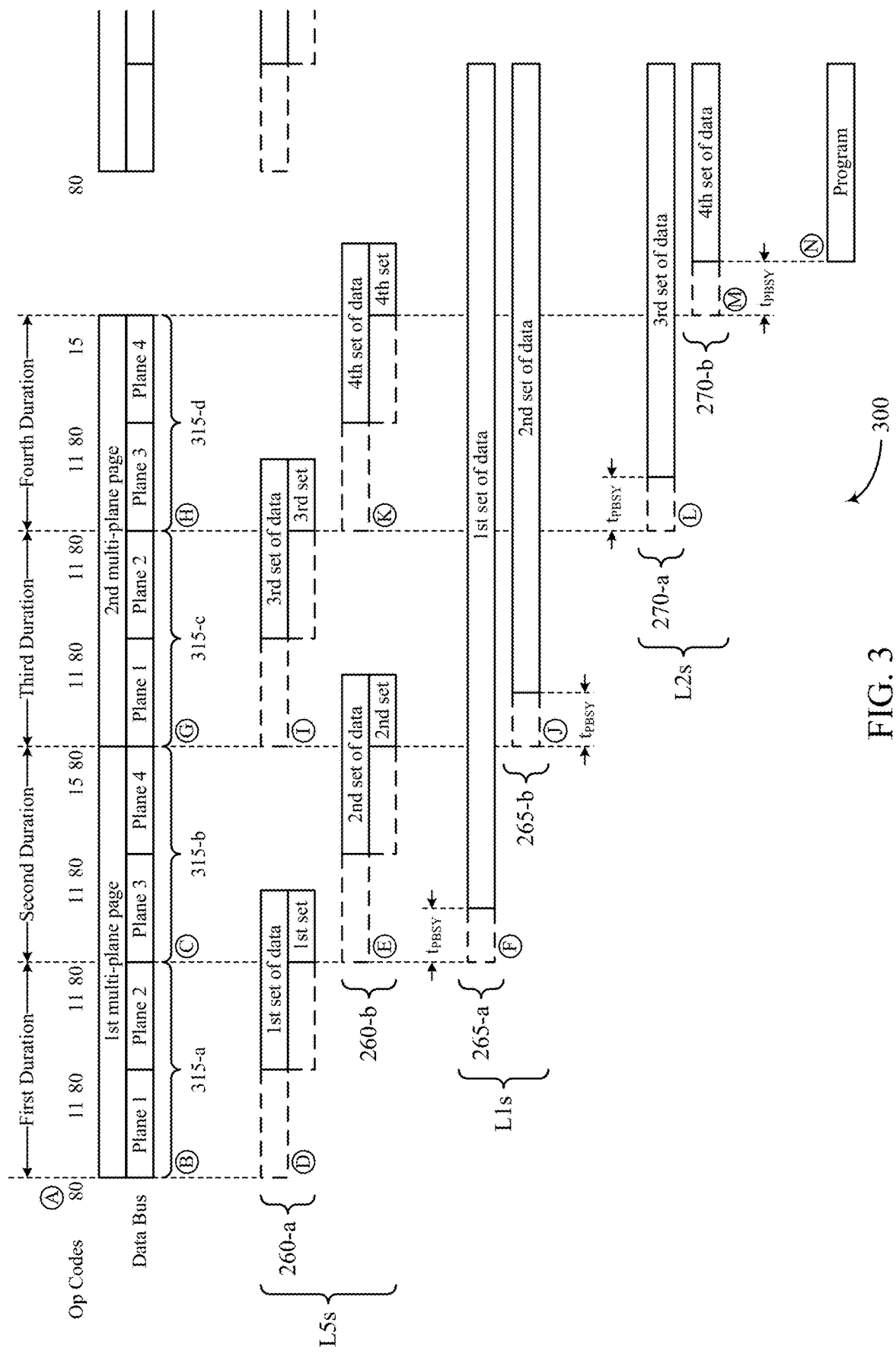
FIGS. 3 and 4 are timing diagrams illustrating examples of write and read operations that support multi-plane cache transfer enhancement in accordance with examples as disclosed herein.
Figure 4:
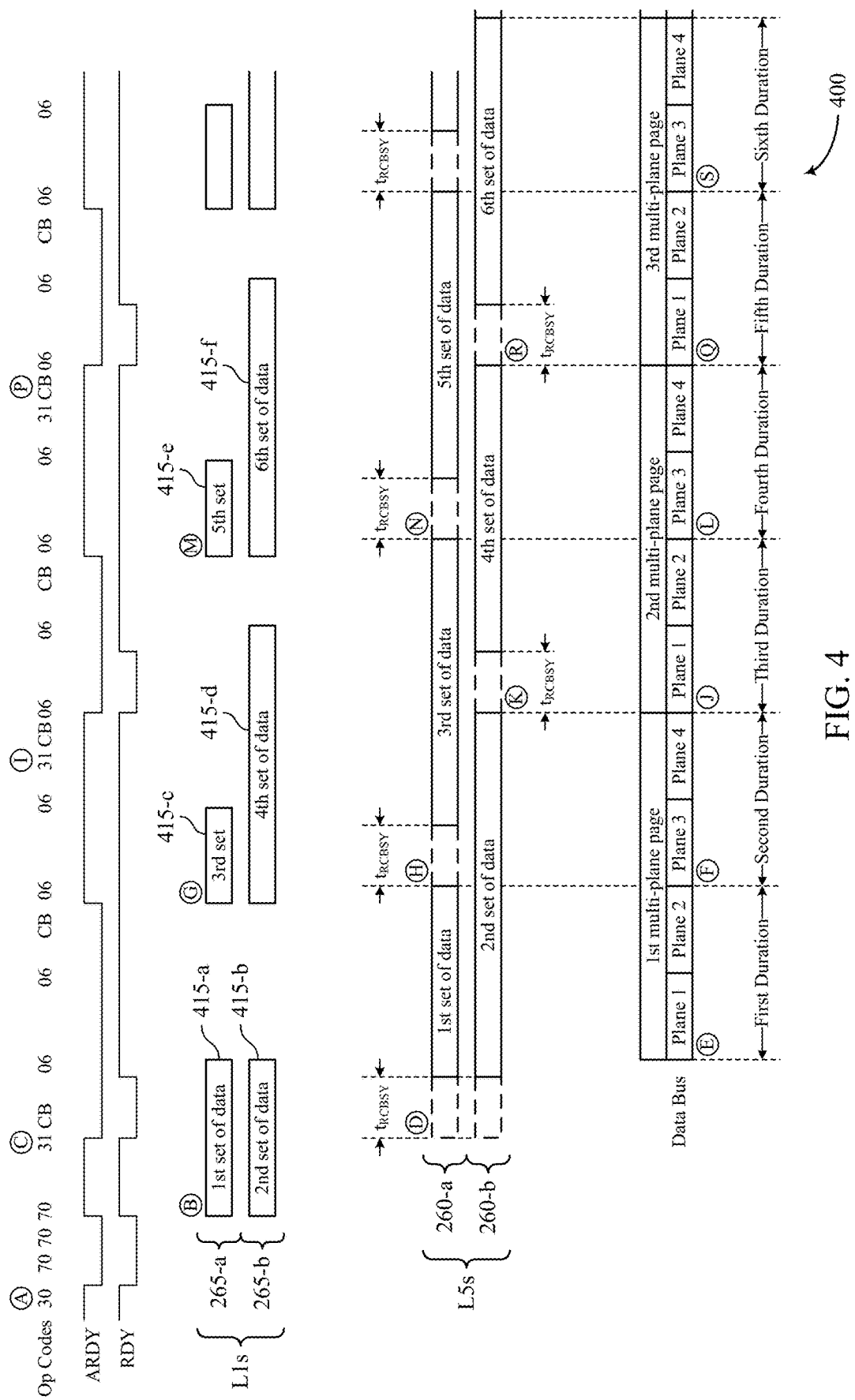

FIGS. 3 and 4 are timing diagrams 300 and 400 respectively illustrating examples of write and read operations that support multi-plane cache transfer enhancement in accordance with examples as disclosed herein. The write and read operation examples are based on the system 200 of FIG. 2. Thus, for the purposes of the timing diagrams 300 and 400, the subsets 260, 265, and 270 of the sets of latches 255-*a* (gateway latches L5), 255-*b* (buffer latches L1), and 255-*c* (buffer latches L2) may be used for passing pages of data between the subsets of planes-subsets 250-*a* (planes 1 and 2) and 250-*b* (planes 3 and 4)—and the memory system controller 205.

The write and read operations may correspond to data associated with multi-level cells. For example, timing diagram 300 may correspond to a portion of a write cache command sequence to transmit a first page (e.g., an upper page UP) and a second page (e.g., an extra page XP) of a TLC (in the depicted example, the lower page LP may have already been transmitted) to a memory device for programming to multiple planes. In some examples, the write and read operations may correspond to data associated with SLCs.

Turning to the write operation illustrated in the timing diagram 300 of FIG. 3: at A, the memory device may receive a write command from the memory system controller. The write command may comprise one or more opcodes that are associated with a page and one or more planes. For example, an opcode 80h or 81h corresponding to a write memory command may be received by the memory device for each plane 225 over an ONFI command bus.

After receiving the write command, the memory device may begin receiving, from the memory system controller using a data bus, a first page of data comprising portions of data associated with each of the planes, received a plane at a time. In the depicted example, a first set of data 315-*a* includes data associated with the first subset of planes 250-*a* (planes 1 and 2) and a second set of data 315-*b* includes data associated with the second subset of planes 250-*b* (planes 3 and 4). Alternatively, one or both subsets of planes may include more than two planes. The two sets of data may be respectively received over different durations. For example, starting at B, the first set of data 315-*a* may begin to be received, and may continue to be received over a first duration; and starting at C, the second set of data 315-*b* may begin to be received, and may continue to be received over a second duration directly after (e.g., directly sequential to) the first duration.

As the first and second sets of data are received, they may be respectively stored in first and second subsets of a set of gateway latches. For example, beginning at D, the first set of data 315-*a* may be stored in the first subset 260-*a* of gateway latches L5 associated with planes 1 and 2 as the first set of data 315-*a* is received from the memory system controller; and beginning at E, the second set of data 315-*b* may be stored in the second subset 260-*b* of gateway latches L5 associated with planes 3 and 4 as the second set of data 315-*b* is received from the memory system controller.

In some examples, the memory system controller may send a command to the memory device to indicate when data for a first or next plane is to be received. For example, opcodes 80h and 11h may be received by the memory device over the ONFI command bus to select a plane and indicate that the transmission of the portion of data associated with the plane has been completed; and an opcode 15h may be received by the memory device to indicate that the transmission of the portion of data associated with the multi-plane page has been completed. Thus, at D, the first set of data may begin to be stored in the first subset 260-a of gateway latches L5 based on an opcode 80h and beginning at E, the second set of data may begin to be stored in the second subset 260-b of gateway latches L5 based on a second opcode 80h received after the opcode 11h. In some examples, the opcode itself may indicate that the next portion of data is associated with the opposite subset of planes.

After the first set of data has been received and stored in the first subset of the set of gateway latches (e.g., after the first duration), the first set of data may be transferred from there to a first subset of a set of buffer latches. For example, at F, the first set of data 315-a associated with planes 1 and 2 may be transferred from the first subset 260-a of gateway latches L5 to the first subset 265-a of buffer latches L1. After a wait time for completing the transfer (e.g., $t_{PBSY}$), the first subset 260-a of the set of gateway latches L5 may be free for receiving other data. In some examples, the first set of data may begin to be transferred from the first subset of gateway latches to the first subset of buffer latches before the data has been completely received and stored in the first subset of gateway latches. That is, the first set of data may begin to be transferred any time during the first duration.

In some examples, to help determine when to perform a transfer between gateway and buffer latches, the memory device may keep track of the plane associated with the data currently being received from the memory system controller. The transfer may be triggered by the memory device based on determining, when changing planes associated with the received data, that the new plane is of a different set of planes than the previous plane (e.g., in response to receiving a command from the memory system controller to write a page or to change planes). For example, the transfer at F may be triggered in response to receiving an opcode 11h at time C to change planes (which results in a change from plane 2 to plane 3 associated with the received data).

In some examples, the transfer may be triggered by the memory device based on receiving a particular command from the memory system controller. For example, the transfer at F may be triggered in response to receiving an opcode 13h at time C indicating that, in addition to changing planes, the memory device is to perform a transfer between gateway and buffer latches associated with the first subset of planes 250-a.

The transfer of the first set of data from a subset of gateway latches to a subset of buffer latches may be performed and completed while the second set of data is being received into a different subset of gateway latches from the memory system controller. For example, the first set of data 315-a may be completely transferred (including with the wait time $t_{PBSY}$) to the first subset 265-a of buffer latches L1 during the second duration. Because of this, the wait time associated with the transfer of data between the gateway and buffer latches may not delay the receipt of further data pages from the memory system controller during a write operation. That is, the external pages may be received with no delay between them.

After the first and second sets of data have been received over the data bus, third and fourth sets of data associated with a second multi-plane page may be received. In some examples, a command (e.g., opcode 15h) may be received by the memory device to indicate the new page. The third and fourth sets of data may be respectively associated with the first and second subsets of planes 250-a, 250-b, and may be received with no delay between the sets of data. The third set of data may be received over a third duration directly after (e.g., directly sequential to) the second duration and the fourth set of data may be received over a fourth duration directly after (e.g., directly sequential to) the third duration. For example, starting at G, a third set of data 315-c associated with planes 1 and 2 may begin to be received, and may continue to be received over the third duration and, starting at H, a fourth set of data 315-d associated with planes 3 and 4 may begin to be received, and may continue to be received directly thereafter, over the fourth duration.

Because the transfer of the first set of data to the first subset of the set of buffer latches may be completed before the end of the second duration, the first subset of the set of gateway latches may be free for receiving other data at the beginning of the third duration. As a result, as the third set of data is received over the third duration, it may be stored in the now-free first subset of the set of gateway latches. For example, beginning at I, the third set of data 315-c associated with planes 1 and 2 may be stored in the first subset 260-a of gateway latches L5 associated with planes 1 and 2 as the third set of data 315-c is received from the memory system controller during the third duration.

In some examples, the storing of the third set of data in the first subset 260-a of gateway latches L5 may be based on a command (e.g., an opcode 15h). In some examples, the opcode may indicate that the next portion of received data is associated with a first subset of planes.

After the second set of data has been received and stored in the second subset of the set of gateway latches (e.g., after the second duration), the second set of data may be transferred from there to a second subset of the set of buffer latches. For example, at J, the second set of data 315-b associated with planes 3 and 4 may be transferred from the second subset 260-b of gateway latches L5 to the second subset 265-b of buffer latches L1. After the wait time for completing the transfer (e.g., $t_{PBSY}$), the second subset 260-b of the set of gateway latches L5 may be free for receiving other data. In some examples, the second set of data may begin to be transferred from the second subset of gateway latches to the second subset of buffer latches before the data has been completely received and stored in the second subset of gateway latches. That is, the second set of data may begin to be transferred any time during the second duration.

The transfer of the second set of data from a subset of gateway latches to buffer latches may be performed and completed while the third set of data is being received into another subset of gateway latches from the memory system controller. For example, the second set of data 315-b may be completely transferred (including with the wait time $t_{PBSY}$) to the second subset 265-b of buffer latches L1 during the third duration. Because of this, the wait time associated with the transfer of data between the gateway and buffer latches may not delay the receipt of further data pages from the memory system controller during a write operation. That is, the external pages may be received with no delay between them.

In some examples, the transfer at J may be triggered based on receiving a command (e.g., an opcode 15h which completes the page transmission initiated at B).

Because the transfer of the second set of data to the second subset of the set of buffer latches may be completed before the end of the third duration, the second subset of the set of gateway latches may be free for receiving other data at the beginning of the fourth duration. As a result, as the fourth set of data is received over the fourth duration, it may be stored in the now-free second subset of the set of gateway latches. For example, beginning at K, the fourth set of data 315-*d* associated with planes 3 and 4 may be stored in the second subset 260-*b* of gateway latches L5 associated with planes 3 and 4 as the fourth set of data 315-*d* is received from the memory system controller during the fourth duration.

In some examples, the storing of the fourth set of data in the second subset 260-*b* of gateway latches L5 may be based on a command (e.g., a second opcode 80h after G). In some examples, the opcode may indicate that the next portion of received data is associated with a first subset of planes.

After the third set of data has been received and stored in the first subset of the set of gateway latches (e.g., after the third duration), the third set of data may be transferred from there to a first subset of another set of buffer latches. For example, at L, the third set of data 315-*c* associated with planes 1 and 2 may be transferred from the first subset 260-*a* of gateway latches L5 to a first subset 270-*a* of buffer latches L2. After the wait time for completing the transfer (e.g., $t_{PBSY}$), the first subset 260-*a* of the set of gateway latches L5 may be free for receiving other data. In some examples, the third set of data may begin to be transferred from the first subset of gateway latches to the first subset of buffer latches before the data has been completely received and stored in the first subset of gateway latches. That is, the third set of data may begin to be transferred any time during the third duration The transfer of the third set of data from a subset of gateway latches to a subset of buffer latches may be performed and completed while the fourth set of data is being received into a different subset of gateway latches from the memory system controller. For example, the third set of data 315-*c* may be completely transferred to the first subset 270-*a* of buffer latches L2 during the fourth duration. Because of this, the wait time associated with the transfer of data between the gateway and buffer latches may not delay the receipt of further data pages from the memory system controller during a write operation. That is, the external pages may be received with no delay between the pages.

In some examples, the transfer at L may be triggered based on receiving a command (e.g., a second opcode 11h after G). In some examples, the transfer may be triggered based on receiving a particular command (e.g., an opcode 13h) indicating that, in addition to changing planes, the memory device is to perform a transfer between gateway and buffer latches associated with the first subset of planes 250-*a*.

After the fourth set of data has been received and stored in the second subset of the set of gateway latches (e.g., after the fourth duration), the fourth set of data may be transferred from there to a second subset of the other set of buffer latches. For example, at M, the fourth set of data 315-*d* associated with planes 3 and 4 may be transferred from the second subset 260-*b* of gateway latches L5 to the second subset 270-*b* of buffer latches L2. After the wait time for completing the transfer (e.g., $t_{PBSY}$), the second subset 260-*b* of the set of gateway latches L5 may be free for receiving other data. In some examples, the fourth set of data may begin to be transferred from the second subset of gateway latches to the second subset of buffer latches before the data has been completely received and stored in the second subset of gateway latches. That is, the fourth set of data may begin to be transferred any time during the fourth duration.

In some examples, the transfer at M may be triggered based on receiving a command (e.g., an opcode 15h which completes the page transmission initiated at G).

After completion of the transfer of the fourth set of data to the second subset of the other set of buffer latches, the memory cells of the first and second subsets of planes may be programmed using the sets of data stored in the sets of buffer latches. For example, at N, after the wait time (e.g., $t_{PBSY}$) for completing the transfer of the fourth set of data 315-*d* to the second subset 270-*b* of buffer latches L2, the memory cells of planes 1-4 that are associated with the first and second multi-plane pages may be programmed using sets of data 315-*a* through 315-*d* stored in the sets of buffer latches L1 and L2 associated with planes 1-4.

Although the depicted example shows two multi-plane pages of data associated with the write command, additional pages may also be received. The additional pages may be handled in a similar manner to the first and second pages. That is, for each additional page, the transferring of the data sets from the set of gateway latches to an additional set of buffer latches may be offset for the different subsets of planes 250. For example, steps G-M may be repeated for each additional page, with the programming of the memory (step N) being performed after the last page.

Turning to the read operation illustrated in the timing diagram 400 of FIG. 4: at A, the memory device may receive a read memory command from the memory system controller. The read memory command may comprise one or more opcodes associated with a page and one or more planes. For example, an opcode 30h or 32h corresponding to a read memory command may be received by the memory device over an ONFI command bus.

In response to receiving the read memory command, the memory device may obtain from the planes, a first multi-plane page of data that may comprise a different portion from each plane. The portions from the first subset of planes may be considered a first set of data and the portions from the second subset of planes may be considered a second set of data. The first and second sets of data associated with the first page may be respectively obtained from the first and second subsets of planes and stored in first and second subsets of a set of buffer latches. For example, at B, a first set of data 415-*a* may be obtained from planes 1 and 2 and stored in a first subset 265-*a* of buffer latches L1; and a second set of data 415-*b* may be obtained from planes 3 and 4 and stored in a second subset 265-*b* of buffer latches L1. This may be done concurrently for the first and second sets of data.

The memory device may then receive a command from the memory system controller to transmit the first multi-plane page to the memory system controller. For example, at C, an opcode 31h may be received by the memory device over the ONFI command bus indicating to the memory device to initiate the next read operation and prepare the previous multi-plane page for transmission to the memory system controller.

In response to receiving the command, the first and second subsets of data may be respectively transferred from the first and second subsets of the set of buffer latches to first and second subsets of a set of gateway latches. For example, at D, the first set of data 415-*a* may be transferred from the first subset 265-*a* of buffer latches L1 to a first subset 260-*a* of gateway latches L5 associated with planes 1 and 2; and the second set of data 415-*b* may be transferred from the second subset 265-*b* of buffer latches L1 to a second subset 260-*b* of gateway latches L5 associated with planes 3 and 4. The transfer may be done concurrently for the first and second sets of data. After a wait time for completing the transfer (e.g. $t_{RCBSY}$), the first and second subsets 265-*a* and 265-*b* of the set of buffer latches L1 may be free for receiving other data.

After the first and second sets of data have been transferred to the first and second subsets of the set of gateway latches, the first and second sets of data may be transmitted from those latches to the memory system controller, a plane at a time, with no delay between the planes. For example, beginning at E, the portions of data associated with planes 1 and 2 (the first set of data 415-*a*) may be transmitted over a data bus to the memory system controller from the first subset 260-*a* of gateway latches L5 over a first duration and beginning at F, the portions of data associated with planes 3 and 4 (the second set of data 415-*b*) may be transmitted over the data bus to the memory system controller from the second subset 265-*a* of gateway latches L5 over a second duration directly after (e.g., directly sequential to) the first duration. In some examples, there may be no delay between transmission of each set of data.

In some examples, the transmitting of the data associated with each plane may be based on receiving a command to do so from the memory system controller. In some examples, the memory system controller may send a command to the memory device when data for a first or next plane is to be transmitted. For example, an opcode 06h may be received by the memory device over the ONFI command bus to select the plane for the transmission. Thus, at E, the first set of data may be transmitted to the memory system controller based on a first opcode 06h received after C and at F, the second set of data may be transmitted to the memory system controller based on a third opcode 06h received after C. In some examples, the opcode may indicate that the set of data to be transmitted is associated with a particular subset of planes. For example, opcodes 1Ah and 1Bh may respectively indicate that the next set of data to be transmitted is associated with the first and second subset of planes. For example, at E, the transmission of the first set of data to the memory system controller from the first subset 260-*a* of gateway latches L5 may be based on an opcode 1Ah received after C and at F, the transmission of the second set of data to the memory system controller from the second subset 260-*b* of gateway latches L5 may be based on an opcode 1Bh received after C.

After the first and second subsets of the set of buffer latches have become free, the memory device may obtain from the planes, a second multi-plane page of data. For example, third and fourth sets of data associated with a second page may be respectively obtained from the first and second subsets of planes and stored in the first and second subsets of the set of buffer latches. For example, at G, a third set of data 415-*c* may be obtained from planes 1 and 2 and stored in the first subset 265-*a* of buffer latches L1; and a fourth set of data 415-*d* may be obtained from planes 3 and 4 and stored in the second subset 265-*b* of buffer latches L1.

After the first set of data has been transmitted to the memory system controller (e.g., after the first duration), the first subset of the set of gateway latches may be free for receiving other data from the buffer latches. As a result, the third set of data may be transferred from the first subset of the set of buffer latches to the first subset of the set of gateway latches after the first duration. For example, beginning at H, the third set of data 415-*c* may be transferred from the first subset 265-*a* of buffer latches L1 to the first subset 260-*a* of gateway latches L5 associated with planes 1 and 2. The transfer may be performed and completed while the second set of data is being transmitted to the memory system controller (i.e., during the second duration). After this, the first subset 265-*a* of the set of buffer latches L1 may be free for receiving other data.

In some examples, the transfer at H may be triggered by the memory device based on determining, when changing planes for transmitting data to the memory system controller, that the new plane is of a different set of planes than the previous plane (e.g., in response to receiving a command from the memory system controller to change planes). For example, the transfer at H may be triggered in response to receiving a third opcode 06h received after C, indicating that the memory device is to transmit data associated with plane 3.

In some examples, the transfer may be triggered by the memory device based on receiving a particular command from the memory system controller. For example, the transfer at H may be triggered in response to receiving an opcode 1Ah (instead of or in conjunction with opcode 06h) indicating that, in addition to transmitting data associated with the new plane, the memory device is to perform a transfer associated with the first subset of planes 250-*a*.

Because the transfer may be performed concurrent with transmitting the second set of data to the memory system controller, the wait time associated with performing the transfer (e.g., $t_{RCBSY}$) of the third set of data between the buffer and gateway latches may not delay the transmitting of the sets of data over the data bus during a read operation. Thus, the pages of data may be transmitted externally with no delay between them.

The memory device may receive a command from the memory system controller to transmit the second multi-plane page to the memory system controller. For example, at I, another opcode 31h may be received by the memory device over the ONFI command bus indicating to the memory device to initiate the read operation of the next multi-plane page and prepare the previous multi-plane page for transmission to the memory system controller.

In response to receiving the command, the third set of data stored in the first subset of the set of gateway latches may be transmitted to the memory system controller after the second set of data has finished transmitting, with no delay between the sets. For example, beginning at J, the third set of data 415-*c* associated with planes 1 and 2 may be transmitted to the memory system controller from the first subset 260-*a* of gateway latches L5 over a third duration directly after (e.g., directly sequential to) the second duration.

In some examples, the transmission of the third set of data to the memory system controller from the first subset 260-*a* of gateway latches L5 may be based on a command (e.g., a first opcode 06h or an opcode 1Bh) received after I.

After the second set of data has been transmitted to the memory system controller (e.g., after the second duration), the second subset of the set of gateway latches may be free for receiving other data from the buffer latches. As a result, the fourth set of data may be transferred from the second subset of the set of buffer latches to the second subset of the set of gateway latches after the second duration. For example, beginning at K, the fourth set of data 415-*d* may be transferred from the second subset 265-*b* of buffer latches L1 to the second subset 260-*b* of gateway latches L5 associated with planes 3 and 4. The transfer may be performed and completed while the third set of data is transmitted to the memory system controller (i.e., during the third duration). After this, the second subset 265-*b* of the set of buffer latches L1 may be free for receiving other data.

In some examples, the transfer at K may be triggered in response to receiving a first opcode 06h received after I, indicating that the memory device is to transmit data associated with plane 1. In some examples, the transfer may be triggered in response to receiving an opcode 1Bh indicating that, in addition to transmitting data associated with the new plane, the memory device is to perform a transfer associated with the second subset of planes 250-*b*.

Because the transfer may be performed concurrent with transmitting the third set of data to the memory system controller, the wait time associated with performing the transfer (e.g., $t_{RCBSY}$) of the fourth set of data between the buffer and gateway latches may not delay the transmitting of the sets of data over the data bus during a read operation. Thus, the pages may be transmitted externally with no delay between them.

After the fourth set of data has been transferred to the second subset of the set of gateway latches, the fourth set of data may be transmitted from those latches to the memory system controller after the third set of data has finished transmitting, with no delay between the sets. For example, beginning at L, the portions of the fourth set of data 415-*d* associated with planes 3 and 4 may be transmitted to the memory system controller from the second subset 260-*b* of gateway latches L5 over a fourth duration directly after (e.g., directly sequential to) the third duration.

In some examples, at L, the transmission of the fourth set of data to the memory system controller from the second subset 260-*b* of gateway latches L5 may be based on a command (e.g., a third opcode 06h or an opcode 1Ah) received after I.

After the first and second subsets of the set of buffer latches have become free, the memory device may obtain from the planes, a third multi-plane page of data. For example, fifth and sixth sets of data associated with a third page may be respectively obtained from the first and second subsets of planes and stored in the first and second subsets of the set of buffer latches. For example, at M, a fifth set of data 415-*e* may be obtained from planes 1 and 2 and stored in the first subset 265-*a* of buffer latches L1; and a sixth set of data 415-*f* may be obtained from planes 3 and 4 and stored in the second subset 265-*b* of buffer latches L1.

After the third set of data has been transmitted to the memory system controller (e.g., after the third duration), the first subset of the set of gateway latches may be free for receiving other data from the buffer latches. As a result, the fifth set of data may be transferred from the first subset of the set of buffer latches to the first subset of the set of gateway latches after the third duration. For example, beginning at N, the fifth set of data 415-*e* may be transferred from the first subset 265-*a* of buffer latches L1 to the first subset 260-*a* of gateway latches L5 associated with planes 1 and 2. The transfer may be performed and completed while the fourth set of data is transmitted to the memory system controller (i.e., during the fourth duration). After the wait time for completing the transfer (e.g., $t_{RCBSY}$), the first subset 265-*a* of the set of buffer latches L1 may be free for receiving other data.

In some examples, the transfer at N may be triggered in response to receiving a command (e.g., a third opcode 06h or an opcode 1Ah received after I), indicating that the memory device is to transmit data associated with plane 3.

Because the transfer may be performed concurrent with transmitting the fourth set of data to the memory system controller, the wait time associated with performing the transfer (e.g., $t_{RCBSY}$) of the fifth set of data between the buffer and gateway latches may not delay the transmitting of sets of data over the data bus during a read operation. Thus, the pages may be transmitted externally with no delay between them.

The memory device may receive a command from the memory system controller to transmit the third multi-plane page to the memory system controller. For example, at P, another opcode 31h may be received by the memory device over the ONFI command bus indicating to the memory device to initiate the read operation of the next multi-plane page and prepare the previous multi-plane page for transmission to the memory system controller.

In response to receiving the command, the fifth set of data stored in the first subset of the set of gateway latches may be transmitted to the memory system controller after the fourth set of data has finished transmitting, with no delay between the sets. For example, beginning at Q, the fifth set of data 415-*e* associated with planes 1 and 2 may be transmitted to the memory system controller from the first subset 260-*a* of gateway latches L5 over a fifth duration directly after (e.g., directly sequential to) the fourth duration.

In some examples, the transmission of the fifth set of data to the memory system controller from the first subset 260-*a* of gateway latches L5 may be based on a command (e.g., a first opcode 06h or an opcode 1Bh) received after P.

After the fourth set of data has been transmitted to the memory system controller (e.g., after the fourth duration), the sixth set of data may be transferred from the second subset of the set of buffer latches to the second subset of the set of gateway latches after the fourth duration. For example, beginning at R, the sixth set of data 415-*f* may be transferred from the second subset 265-*b* of buffer latches L1 to the second subset 260-*b* of gateway latches L5 associated with planes 3 and 4. The transfer may be performed and completed while the fifth set of data is transmitted to the memory system controller (i.e., during the fifth duration). After this, the second subset 265-*b* of the set of buffer latches L1 may be free for receiving other data.

In some examples, the transfer at R may be triggered in response to receiving a command (e.g., a first opcode 06h or an opcode 1Bh received after P), indicating that the memory device is to transmit data associated with plane 1.

Because the transfer may be performed concurrent with transmitting the fifth set of data to the memory system controller, the wait associated with performing the transfer (e.g., $t_{RCBSY}$) of the sixth set of data between the buffer and gateway latches may not delay the transmitting of sets of data over the data bus during a read operation. Thus, the pages may be transmitted externally with no delay between the pages.

After the sixth set of data has been transferred to the second subset of the set of gateway latches, the sixth set of data may be transmitted from those latches to the memory system controller after the fifth set of data has finished transmitting, with no delay between the sets. For example, beginning at S, the sixth set of data 415-*f* associated with planes 3 and 4 may be transmitted over the data bus to the memory system controller from the second subset 260-*b* of gateway latches L5 over a sixth duration directly after (e.g., directly sequential to) the fifth duration.

In some examples, at S, the transmission of the sixth set of data to the memory system controller from the second subset 260-*b* of gateway latches L5 may be based on a command (e.g., a third opcode 06h or an opcode 1Ah) received after P.

Although the depicted example shows three multi-plane pages of data associated with the read command, two pages may instead be transmitted. For example, steps M-S may be omitted. More than three pages may also be transmitted. Each additional page may be handled in a similar manner to the first, second, and third pages. That is, for each additional page, the transferring of the data sets from the set of buffer latches to the set of gateway latches may be offset for the different subsets of planes 250. For example, steps M-S may be repeated for each additional page.

Figure 5:
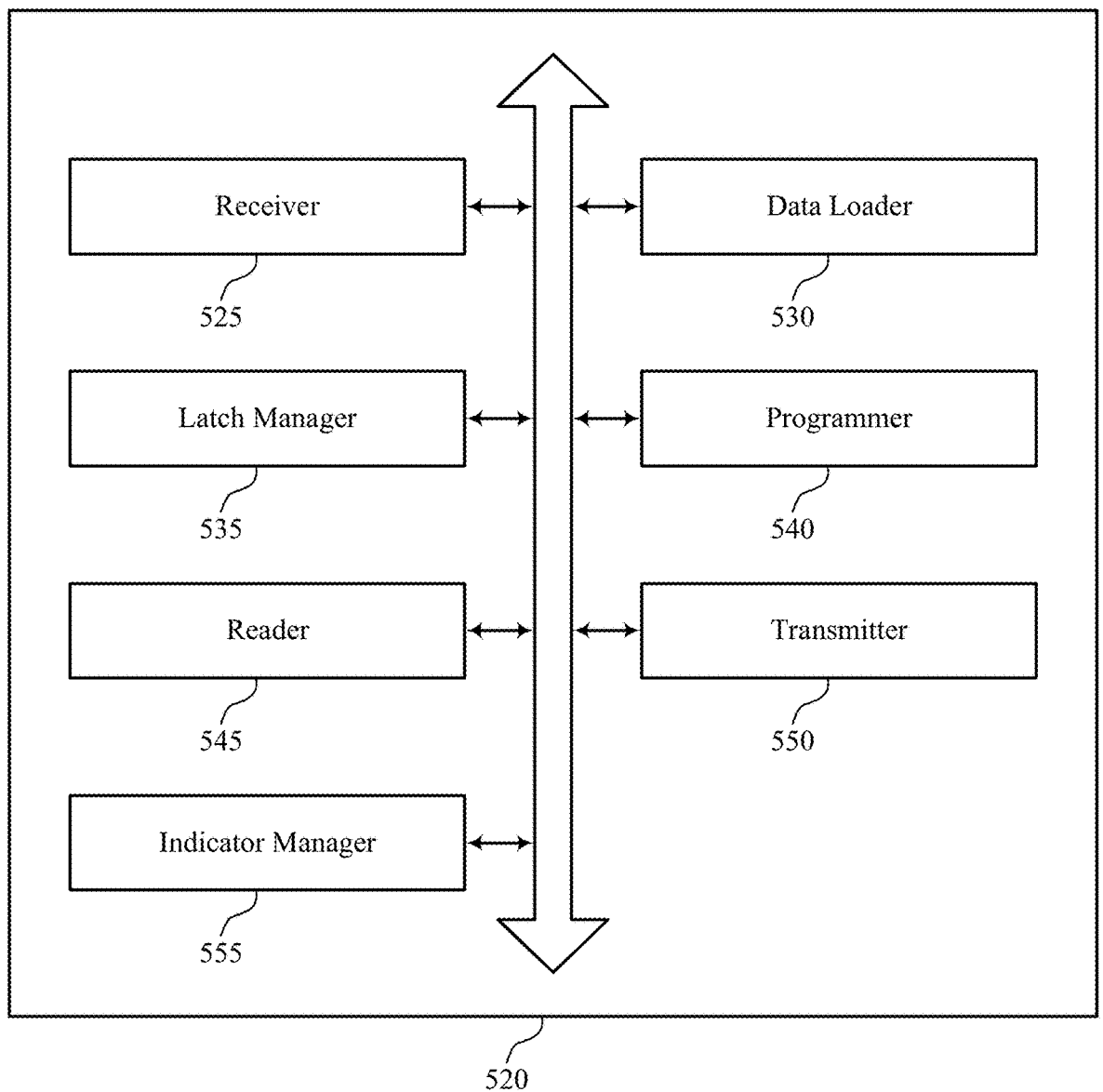
FIG. 5 shows a block diagram of a memory device that supports multi-plane cache transfer enhancement in accordance with examples as disclosed herein.

FIG. 5 shows a block diagram 500 of a memory device 520 that supports multi-plane cache transfer enhancement in accordance with examples as disclosed herein. The memory device 520 may be an example of aspects of a memory device as described with reference to FIGS. 1 through 4. The memory device 520, or various components thereof, may be an example of means for performing various aspects of multi-plane cache transfer enhancement as described herein. For example, the memory device 520 may include a receiver 525, a data loader 530, a latch manager 535, a programmer 540, a reader 545, a transmitter 550, an indicator manager 555, or any combination thereof. Each of these components may communicate, directly or indirectly, with one another (e.g., via one or more buses).

The receiver 525 may be configured as or otherwise support a means for receiving, at a memory device, a write command associated with a plurality of pages and a plurality of planes. The data loader 530 may be configured as or otherwise support a means for loading, over a first duration, a first set of data associated with a first page of the plurality of pages and with a first subset of planes of the plurality of planes into a first subset of a first set of latches. In some examples, the data loader 530 may be configured as or otherwise support a means for loading, over a second duration, a second set of data associated with the first page and with a second subset of planes of the plurality of planes into a second subset of the first set of latches. The latch manager 535 may be configured as or otherwise support a means for transferring, during the second duration, the first set of data from the first subset of the first set of latches to a first subset of a second set of latches.

In some examples, the data loader 530 may be configured as or otherwise support a means for loading, over a third duration, a third set of data associated with a second page of the plurality of pages and with the first subset of planes into the first subset of the first set of latches. In some examples, the latch manager 535 may be configured as or otherwise support a means for transferring, during the third duration, the second set of data from the second subset of the first set of latches to a second subset of the second set of latches. In some examples, the latch manager 535 may be configured as or otherwise support a means for loading, over a fourth duration, a fourth set of data associated with the second page and the second subset of planes into the second subset of the first set of latches. The programmer 540 may be configured as or otherwise support a means for programming the first, second, third, and fourth sets of data to memory cells of the memory device.

In some examples, the third duration may be directly sequential to the second duration.

In some examples, the memory device may include an indicator indicating one of the first subset of planes or the second subset of planes, and the indicator manager 555 may be configured as or otherwise support a means for determining that the indicator indicates the first subset of planes, where loading the first set of data into the first subset of the first set of latches and loading the second set of data into the first subset of the first set of latches are based at least in part on determining that the indicator indicates the first subset of planes. In some examples, the memory device may include an indicator indicating one of the first subset of planes or the second subset of planes, and the indicator manager 555 may be configured as or otherwise support a means for determining that the indicator indicates the second subset of planes, where loading the third set of data into the second subset of the first set of latches and loading the fourth set of data into the second subset of the first set of latches are based at least in part on determining that the indicator indicates the second subset of planes.

In some examples, the indicator manager 555 may be configured as or otherwise support a means for setting the indicator to indicate the first set of planes based at least in part on receiving the write command, where determining that the indicator indicates the first subset of planes is based at least in part on setting the indicator to indicate the first set of planes. In some examples, the receiver 525 may be configured as or otherwise support a means for receiving a second command to change planes. In some examples, the indicator manager 555 may be configured as or otherwise support a means for setting the indicator to indicate the second set of planes based at least in part on the indicator indicating the first set of planes when receiving the second command, where determining that the indicator indicates the second subset of planes is based at least in part on setting the indicator to indicate the second set of planes.

In some examples, the indicator manager 555 may be configured as or otherwise support a means for changing the indicator to indicate the second subset of planes after loading the second set of data into the first subset of the first set of latches. In some examples, the indicator manager 555 may be configured as or otherwise support a means for changing the indicator to indicate the first subset of planes after loading the fourth set of data into the second subset of the first set of latches.

In some examples, the receiver 525 may be configured as or otherwise support a means for receiving a first indication in conjunction with the first and second sets of data, the first indication indicating the first subset of planes, where loading the first set of data into the first subset of the first set of latches and loading the second set of data into the first subset of the first set of latches are based at least in part on receiving the first indication. In some examples, the receiver 525 may be configured as or otherwise support a means for receiving a second indication in conjunction with the third and fourth sets of data, the second indication indicating the second subset of planes, where loading the third set of data into the second subset of the first set of latches and loading the fourth set of data into the second subset of the first set of latches are based at least in part on receiving the second indication.

In some examples, to support receiving the first indication, the receiver 525 may be configured as or otherwise support a means for receiving a first command to trigger a first data transfer using the first subset of planes, where loading the first set of data into the first subset of the first set of latches and loading the second set of data into the first subset of the first set of latches are based at least in part on receiving the first command. In some examples, to support receiving the second indication, the receiver 525 may be configured as or otherwise support a means for receiving a second command to trigger a second data transfer using the second subset of planes, where loading the third set of data into the second subset of the first set of latches and loading the fourth set of data into the second subset of the first set of latches are based at least in part on receiving the second command.

In some examples, the latch manager 535 may be configured as or otherwise support a means for transferring, during the fourth duration, the third set of data from the first subset of the first set of latches to a first subset of a third set of latches.

In some examples, the latch manager 535 may be configured as or otherwise support a means for transferring, after the fourth duration, the fourth set of data from the second subset of the first set of latches to a second subset of the third set of latches, where programming the first, second, third, and fourth sets of data is based at least in part on transferring the fourth set of data to the second subset of the third set of latches.

In some examples, to support programming the first, second, third, and fourth sets of data to the memory cells, the programmer 540 may be configured as or otherwise support a means for programming the first, second, third, and fourth sets of data using the first and second sets of data loaded in the first and second subsets of the second set of latches, and the third and fourth sets of data loaded in the first and second subsets of the third set of latches.

In some examples, the data loader 530 may be configured as or otherwise support a means for loading, over a fifth duration, a fifth set of data associated with a third page of the plurality of pages and the first subset of planes into the first subset of the first set of latches, where loading the fifth set of data is based at least in part on transferring the third set of data to the first subset of the third set of latches. In some examples, the latch manager 535 may be configured as or otherwise support a means for transferring, during the fifth duration, the fourth set of data from the second subset of the first set of latches to a second subset of the third set of latches. In some examples, the data loader 530 may be configured as or otherwise support a means for loading, during a sixth duration, a sixth set of data associated with the third page and the second subset of planes into the second subset of the first set of latches.

In some examples, the latch manager 535 may be configured as or otherwise support a means for transferring, during the sixth duration, the fifth set of data from the first subset of the first set of latches to a first subset of a fourth set of latches. In some examples, the latch manager 535 may be configured as or otherwise support a means for transferring, after the sixth duration, the sixth set of data from the second subset of the first set of latches to a second subset of the fourth set of latches. In some examples, the programmer 540 may be configured as or otherwise support a means for programming the fifth and sixth sets of data to memory cells of the memory device.

In some examples, the first and second pages may correspond to pages of multi-level cells of the memory device.

In some examples, the first subset of planes and the second subset of planes may be disjoint subsets that each include at least two planes.

In some examples, the receiver 525 may be configured as or otherwise support a means for receiving, at a memory device, a read memory command associated with a plurality of pages and a plurality of planes. The reader 545 may be configured as or otherwise support a means for obtaining, from memory of the memory device, a first set of data associated with a first page of the plurality of pages and with a first subset of planes of the plurality of planes, and a second set of data associated with the first page and with a second subset of planes of the plurality of planes, the obtaining the first set of data including loading the first set of data into a first subset of a first set of latches and the second set of data into a second subset of the first set of latches.

In some examples, the receiver 525 may be configured as or otherwise support a means for receiving a command to transmit the first page. In some examples, the latch manager 535 may be configured as or otherwise support a means for transferring the first set of data from the first subset of the first set of latches to a first subset of a second set of latches and the second set of data from the second subset of the first set of latches to a second subset of a second set of latches. The transmitter 550 may be configured as or otherwise support a means for transmitting, over a first duration and in response to receiving the command to transmit the first page, the first set of data from the first subset of the second set of latches.

In some examples, the transmitter 550 may be configured as or otherwise support a means for transmitting, over a second duration, the second set of data from the second subset of the second set of latches. In some examples, the reader 545 may be configured as or otherwise support a means for obtaining, from the memory of the memory device after transferring the first and second sets of data from the first and second subsets of the first set of latches to the first and second subsets of the second set of latches, a third set of data associated with a second page of the plurality of pages and with the first subset of planes and a fourth set of data associated with the second page and with the second subset of planes, where the obtaining the third set of data includes loading the third set of data into the first subset of the first set of latches and the second subset of planes, and the fourth set of data into the second subset of the first set of latches.

In some examples, the latch manager 535 may be configured as or otherwise support a means for transferring, during the second duration, the third set of data from the first subset of the first set of latches to the first subset of the second set of latches. In some examples, the receiver 525 may be configured as or otherwise support a means for receiving a command to transmit the second page. In some examples, the transmitter 550 may be configured as or otherwise support a means for transmitting, over a third duration, the third set of data from the first subset of the second set of latches.

In some examples, the latch manager 535 may be configured as or otherwise support a means for transferring, during the third duration, the fourth set of data from the second subset of the first set of latches to the second subset of the second set of latches. In some examples, the transmitter 550 may be configured as or otherwise support a means for transmitting, over a fourth duration, the fourth set of data from the second subset of the second set of latches.

In some examples, the third duration may be directly sequential to the second duration.

In some examples, the memory device may include an indicator indicating one of the first subset of planes or the second subset of planes, and the indicator manager 555 may be configured as or otherwise support a means for determining that the indicator indicates the first subset of planes, where transferring the third set of data to the first subset of the second set of latches is based at least in part on determining that the indicator indicates the first subset of planes. In some examples, the memory device may include an indicator indicating one of the first subset of planes or the second subset of planes, and the indicator manager 555 may be configured as or otherwise support a means for determining that the indicator indicates the second subset of planes, where transferring the fourth set of data to the second subset of the second set of latches is based at least in part on determining that the indicator indicates the second subset of planes.

In some examples, the receiver 525 may be configured as or otherwise support a means for receiving a command to change planes. In some examples, the indicator manager 555 may be configured as or otherwise support a means for setting the indicator to indicate the first set of planes based at least in part on the indicator indicating the second set of planes when receiving the command to change planes, where determining that the indicator indicates the first subset of planes is based at least in part on setting the indicator to indicate the first set of planes. In some examples, the indicator manager 555 may be configured as or otherwise support a means for setting the indicator to indicate the second set of planes based at least in part on the indicator indicating the first set of planes when receiving the command to change planes, where determining that the indicator indicates the second subset of planes is based at least in part on setting the indicator to indicate the second set of planes.

In some examples, the indicator manager 555 may be configured as or otherwise support a means for changing the indicator to indicate the second subset of planes after transferring the first set of data to the first subset of the second set of latches. In some examples, the indicator manager 555 may be configured as or otherwise support a means for changing the indicator to indicate the first subset of planes after transferring the second set of data to the second subset of the second set of latches.

In some examples, the receiver 525 may be configured as or otherwise support a means for receiving a first indication indicating the first subset of planes, where transferring the third set of data to the first subset of the second set of latches is based at least in part on determining that the indicator indicates the first subset of planes. In some examples, the receiver 525 may be configured as or otherwise support a means for receiving a second indication indicating the second subset of planes, where transferring the fourth set of data to the second subset of the second set of latches is based at least in part on determining that the indicator indicates the second subset of planes.

In some examples, to support receiving the first indication, the receiver 525 may be configured as or otherwise support a means for receiving a first command to trigger a first data transfer using the first subset of planes, where transferring the first set of data to the first subset of the second set of latches is based at least in part on receiving the first command. In some examples, to support receiving the second indication, the receiver 525 may be configured as or otherwise support a means for receiving a second command to trigger a second data transfer using the second subset of planes, where transferring the second set of data to the second subset of the second set of latches is based at least in part on receiving the second command.

In some examples, to support transferring the third set of data to the first subset of the second set of latches, the latch manager 535 may be configured as or otherwise support a means for overwriting the first set of data in the first subset of the second set of latches with the third set of data.

In some examples, the first and second pages may correspond to pages of multi-level cells of the memory device.

In some examples, the first subset of planes and the second subset of planes may be disjoint subsets that each include at least two planes.

Figure 6:
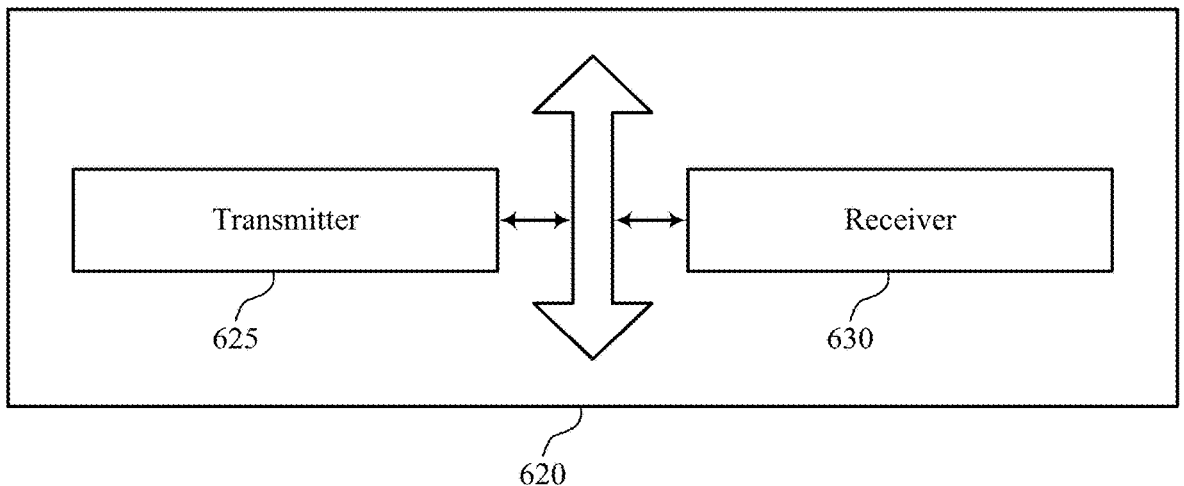
FIG. 6 shows a block diagram of a memory system that supports multi-plane cache transfer enhancement in accordance with examples as disclosed herein.

FIG. 6 shows a block diagram 600 of a memory system 620 that supports multi-plane cache transfer enhancement in accordance with examples as disclosed herein. The memory system 620 may be an example of aspects of a memory system as described with reference to FIGS. 1 through 4. The memory system 620, or various components thereof, may be an example of means for performing various aspects of multi-plane cache transfer enhancement as described herein. For example, the memory system 620 may include a transmitter 625 a receiver 630, or any combination thereof. Each of these components may communicate, directly or indirectly, with one another (e.g., via one or more buses).

The transmitter 625 may be configured as or otherwise support a means for transmitting, from a controller to a memory device, a write command associated with a plurality of pages and a plurality of planes. In some examples, the transmitter 625 may be configured as or otherwise support a means for transmitting, to the memory device over a first duration, a first set of data associated with a first page of the plurality of pages and with a first subset of the plurality of planes. In some examples, the transmitter 625 may be configured as or otherwise support a means for transmitting, to the memory device, a command to change planes. In some examples, the transmitter 625 may be configured as or otherwise support a means for transmitting, to the memory device over a second duration, a second set of data associated with the first page and with a second subset of the plurality of planes. In some examples, the transmitter 625 may be configured as or otherwise support a means for transmitting, to the memory device, a command to write a second page of the plurality of pages. In some examples, the transmitter 625 may be configured as or otherwise support a means for transmitting, to the memory device over a third duration, a third set of data associated with the second page and with a first subset of the plurality of planes, where the third duration is directly sequential to the second duration.

In some examples, the transmitter 625 may be configured as or otherwise support a means for transmitting, to the memory device during the third duration, a second command to change planes. In some examples, the transmitter 625 may be configured as or otherwise support a means for transmitting, to the memory device over a fourth duration, a fourth set of data associated with the second page, where the fourth duration is directly sequential to the third duration.

In some examples, the first subset of planes and the second subset of planes may be disjoint subsets that each include at least two planes.

In some examples, the transmitter 625 may be configured as or otherwise support a means for transmitting, from a controller to a memory device, a memory read command associated with a plurality of pages and a plurality of planes. In some examples, the transmitter 625 may be configured as or otherwise support a means for transmitting, to the memory device, a command to send data associated with a first page of the plurality of pages. The receiver 630 may be configured as or otherwise support a means for receiving, from the memory device over a first duration, a first set of data associated with the first page and a first subset of planes of the plurality of planes. In some examples, the receiver 630 may be configured as or otherwise support a means for receiving, from the memory device over a second duration, a second set of data associated with the first page and a second subset of planes of the plurality of planes. In some examples, the transmitter 625 may be configured as or otherwise support a means for transmitting, to the memory device, a command to send data associated with a second page of the plurality of pages. In some examples, the receiver 630 may be configured as or otherwise support a means for receiving, from the memory device over a third duration, a third set of data associated with the second page and with the first subset of planes of the plurality of planes, where the third duration is directly sequential to the second duration.

In some examples, the transmitter 625 may be configured as or otherwise support a means for transmitting, to the memory device during the third duration, a command to change planes. In some examples, the receiver 630 may be configured as or otherwise support a means for receiving, from the memory device over a fourth duration, a fourth set of data associated with the second page and a second subset of planes of the plurality of planes, where the fourth duration is directly sequential to the third duration.

In some examples, the first subset of planes and the second subset of planes are disjoint subsets that each include at least two planes.

Figure 7:
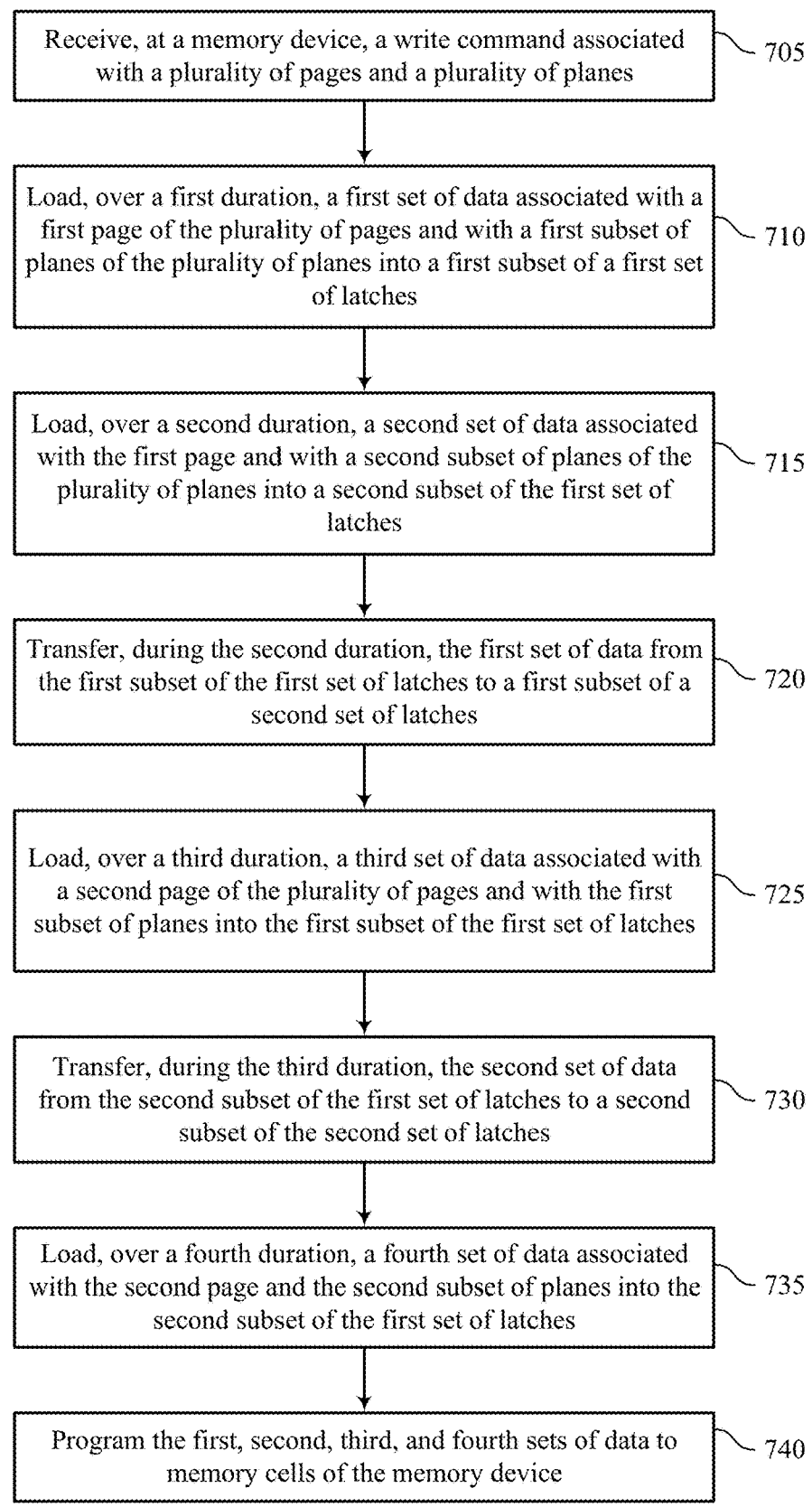
FIGS. 7 through 10 show flowcharts illustrating methods that support multi-plane cache transfer enhancement in accordance with examples as disclosed herein.

FIG. 7 shows a flowchart illustrating a method 700 that supports multi-plane cache transfer enhancement in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the wireless memory device may perform aspects of the described functions using special-purpose hardware.

At 705, the method may include receiving, at a memory device, a write command associated with a plurality of pages and a plurality of planes. The operations of 705 may be performed in accordance with examples as disclosed herein. In some examples, aspects of the operations of 705 may be performed by a receiver 525 as described with reference to FIG. 5.

At 710, the method may include loading, over a first duration, a first set of data associated with a first page of the plurality of pages and with a first subset of planes of the plurality of planes into a first subset of a first set of latches. The operations of 710 may be performed in accordance with examples as disclosed herein. In some examples, aspects of the operations of 710 may be performed by a data loader 530 as described with reference to FIG. 5.

At 715, the method may include loading, over a second duration, a second set of data associated with the first page and with a second subset of planes of the plurality of planes into a second subset of the first set of latches. The operations of 715 may be performed in accordance with examples as disclosed herein. In some examples, aspects of the operations of 715 may be performed by a data loader 530 as described with reference to FIG. 5.

At 720, the method may include transferring, during the second duration, the first set of data from the first subset of the first set of latches to a first subset of a second set of latches. The operations of 720 may be performed in accordance with examples as disclosed herein. In some examples, aspects of the operations of 720 may be performed by a latch manager 535 as described with reference to FIG. 5.

At 725, the method may include loading, over a third duration, a third set of data associated with a second page of the plurality of pages and with the first subset of planes into the first subset of the first set of latches. The operations of 725 may be performed in accordance with examples as disclosed herein. In some examples, aspects of the operations of 725 may be performed by a data loader 530 as described with reference to FIG. 5.

At 730, the method may include transferring, during the third duration, the second set of data from the second subset of the first set of latches to a second subset of the second set of latches. The operations of 730 may be performed in accordance with examples as disclosed herein. In some examples, aspects of the operations of 730 may be performed by a latch manager 535 as described with reference to FIG. 5.

At 735, the method may include loading, over a fourth duration, a fourth set of data associated with the second page and the second subset of planes into the second subset of the first set of latches. The operations of 735 may be performed in accordance with examples as disclosed herein. In some examples, aspects of the operations of 735 may be performed by a latch manager 535 as described with reference to FIG. 5.

At 740, the method may include programming the first, second, third, and fourth sets of data to memory cells of the memory device. The operations of 740 may be performed in accordance with examples as disclosed herein. In some examples, aspects of the operations of 740 may be performed by a programmer 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a write command associated with a plurality of pages and a plurality of planes; loading, over a first duration, a first set of data associated with a first page of the plurality of pages and with a first subset of planes of the plurality of planes into a first subset of a first set of latches; loading, over a second duration, a second set of data associated with the first page and with a second subset of planes of the plurality of planes into a second subset of the first set of latches; transferring, during the second duration, the first set of data from the first subset of the first set of latches to a first subset of a second set of latches; loading, over a third duration, a third set of data associated with a second page of the plurality of pages and with the first subset of planes into the first subset of the first set of latches; transferring, during the third duration, the second set of data from the second subset of the first set of latches to a second subset of the second set of latches; loading, over a fourth duration, a fourth set of data associated with the second page and the second subset of planes into the second subset of the first set of latches; and programming the first, second, third, and fourth sets of data to memory cells of the memory device.

Aspect 2: The method, apparatus, or non-transitory computer-readable medium of aspect 1, where the third duration is directly sequential to the second duration.

Aspect 3: The method, apparatus, or non-transitory computer-readable medium of any of aspects 1 through 2, where the memory device includes an indicator indicating one of the first subset of planes or the second subset of planes and the method, apparatuses, and non-transitory computer-readable medium further includes operations, features, circuitry, logic, means, or instructions, or any combination thereof for determining that the indicator indicates the first subset of planes, where loading the first set of data into the first subset of the first set of latches and loading the second set of data into the first subset of the first set of latches are based at least in part on determining that the indicator indicates the first subset of planes and determining that the indicator indicates the second subset of planes, where loading the third set of data into the second subset of the first set of latches and loading the fourth set of data into the second subset of the first set of latches are based at least in part on determining that the indicator indicates the second subset of planes.

Aspect 4: The method, apparatus, or non-transitory computer-readable medium of aspect 3, where the method, apparatuses, and non-transitory computer-readable medium further includes operations, features, circuitry, logic, means, or instructions, or any combination thereof for setting the indicator to indicate the first subset of planes based at least in part on receiving the write command, where determining that the indicator indicates the first subset of planes is based at least in part on setting the indicator to indicate the first subset of planes; receiving a second command to change planes; and setting the indicator to indicate the second subset of planes based at least in part on the indicator indicating the first subset of planes when receiving the second command, where determining that the indicator indicates the second subset of planes is based at least in part on setting the indicator to indicate the second subset of planes.

Aspect 5: The method, apparatus, or non-transitory computer-readable medium of any of aspects 3 through 4, further including operations, features, circuitry, logic, means, or instructions, or any combination thereof for changing the indicator to indicate the second subset of planes after loading the second set of data into the first subset of the first set of latches and changing the indicator to indicate the first subset of planes after loading the fourth set of data into the second subset of the first set of latches.

Aspect 6: The method, apparatus, or non-transitory computer-readable medium of any of aspects 1 through 5, further including operations, features, circuitry, logic, means, or instructions, or any combination thereof for receiving a first indication in conjunction with the first and second sets of data, the first indication indicating the first subset of planes, where loading the first set of data into the first subset of the first set of latches and loading the second set of data into the first subset of the first set of latches are based at least in part on receiving the first indication and receiving a second indication in conjunction with the third and fourth sets of data, the second indication indicating the second subset of planes, where loading the third set of data into the second subset of the first set of latches and loading the fourth set of data into the second subset of the first set of latches are based at least in part on receiving the second indication.

Aspect 7: The method, apparatus, or non-transitory computer-readable medium of aspect 6, where receiving the first indication includes receiving a first command to trigger a first data transfer using the first subset of planes, where loading the first set of data into the first subset of the first set of latches and loading the second set of data into the first subset of the first set of latches are based at least in part on receiving the first command and receiving the second indication includes receiving a second command to trigger a second data transfer using the second subset of planes, where loading the third set of data into the second subset of the first set of latches and loading the fourth set of data into the second subset of the first set of latches are based at least in part on receiving the second command.

Aspect 8: The method, apparatus, or non-transitory computer-readable medium of any of aspects 1 through 7, further including operations, features, circuitry, logic, means, or instructions, or any combination thereof for transferring, during the fourth duration, the third set of data from the first subset of the first set of latches to a first subset of a third set of latches.

Aspect 9: The method, apparatus, or non-transitory computer-readable medium of aspect 8, further including operations, features, circuitry, logic, means, or instructions, or any combination thereof for transferring, after the fourth duration, the fourth set of data from the second subset of the first set of latches to a second subset of the third set of latches, where programming the first, second, third, and fourth sets of data is based at least in part on transferring the fourth set of data to the second subset of the third set of latches.

Aspect 10: The method, apparatus, or non-transitory computer-readable medium of aspect 9, where programming the first, second, third, and fourth sets of data to the memory cells includes operations, features, circuitry, logic, means, or instructions, or any combination thereof for programming the first, second, third, and fourth sets of data using the first and second sets of data loaded in the first and second subsets of the second set of latches, and the third and fourth sets of data loaded in the first and second subsets of the third set of latches.

Aspect 11: The method, apparatus, or non-transitory computer-readable medium of any of aspects 8 through 10, further including operations, features, circuitry, logic, means, or instructions, or any combination thereof for loading, over a fifth duration, a fifth set of data associated with a third page of the plurality of pages and the first subset of planes into the first subset of the first set of latches, where loading the fifth set of data is based at least in part on transferring the third set of data to the first subset of the third set of latches; transferring, during the fifth duration, the fourth set of data from the second subset of the first set of latches to a second subset of the third set of latches; loading, during a sixth duration, a sixth set of data associated with the third page and the second subset of planes into the second subset of the first set of latches; transferring, during the sixth duration, the fifth set of data from the first subset of the first set of latches to a first subset of a fourth set of latches; transferring, after the sixth duration, the sixth set of data from the second subset of the first set of latches to a second subset of the fourth set of latches; and programming the fifth and sixth sets of data to memory cells of the memory device.

Aspect 12: The method, apparatus, or non-transitory computer-readable medium of any of aspects 1 through 11, where the first and second pages correspond to pages of multi-level cells of the memory device.

Aspect 13: The method, apparatus, or non-transitory computer-readable medium of any of aspects 1 through 12, where the first subset of planes and the second subset of planes are disjoint subsets that each include at least two planes.

Figure 8A:
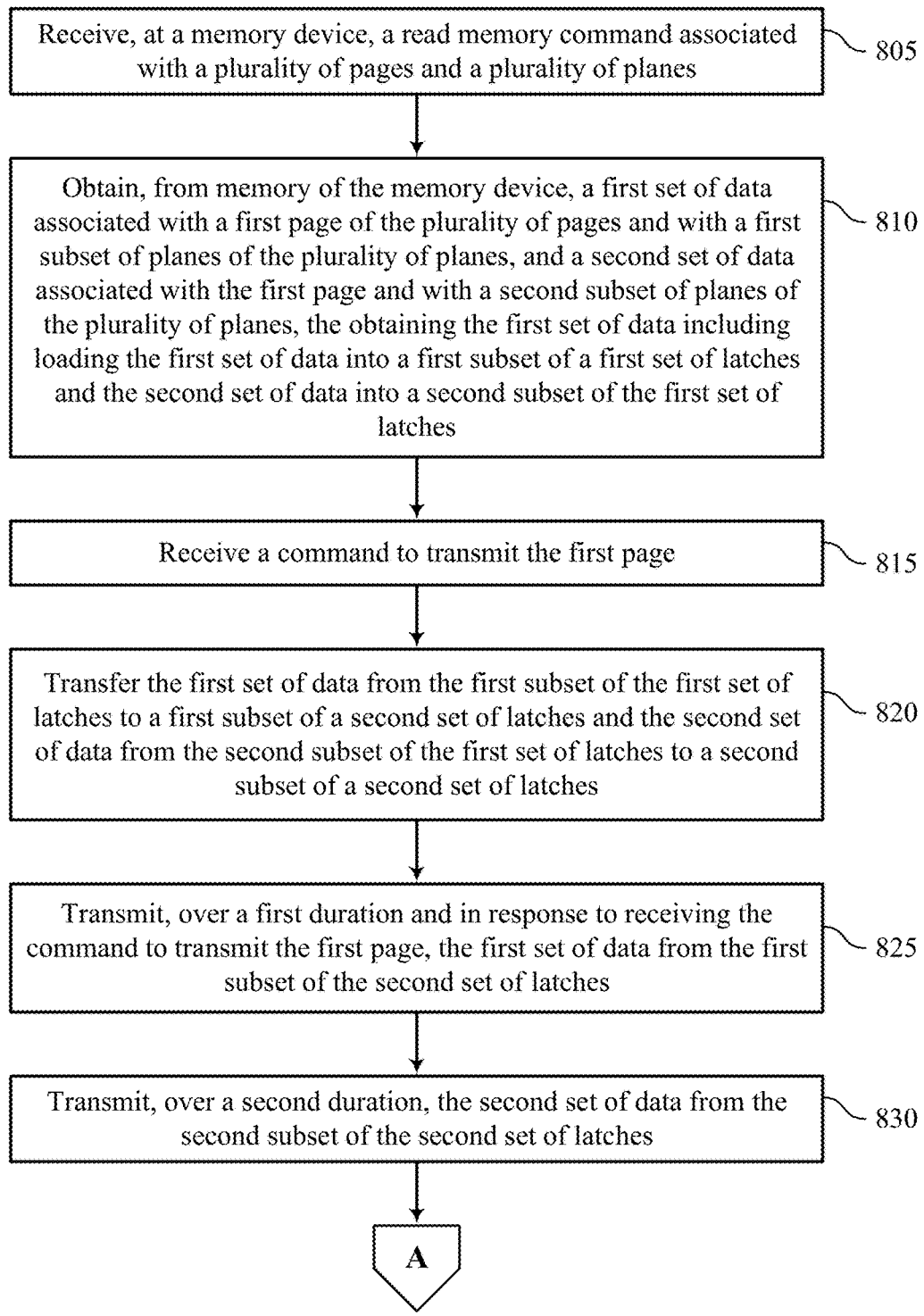
Figure 8B:
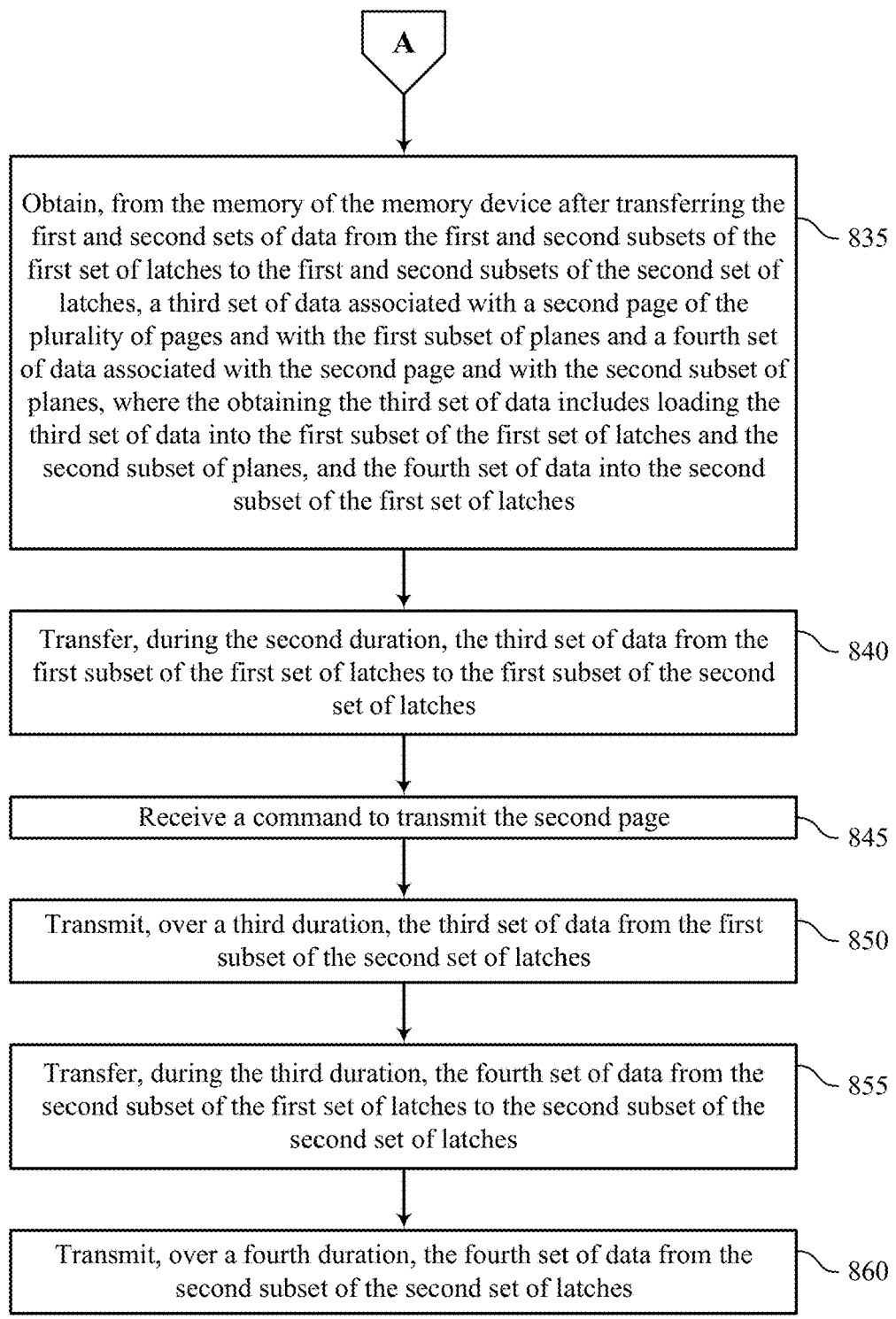

FIGS. 8A and 8B show a flowchart illustrating a method 800 that supports multi-plane cache transfer enhancement in accordance with examples as disclosed herein. The operations of method 800 may be implemented by a memory device or its components as described herein. For example, the operations of method 800 may be performed by a memory device as described with reference to FIGS. 1 through 5. In some examples, a memory device may execute a set of instructions to control the functional elements of the device to perform the described functions. Additionally, or alternatively, the wireless memory device may perform aspects of the described functions using special-purpose hardware.

At 805, the method may include receiving, at a memory device, a read memory command associated with a plurality of pages and a plurality of planes. The operations of 805 may be performed in accordance with examples as disclosed herein. In some examples, aspects of the operations of 805 may be performed by a receiver 525 as described with reference to FIG. 5.

At 810, the method may include obtaining, from memory of the memory device, a first set of data associated with a first page of the plurality of pages and with a first subset of planes of the plurality of planes, and a second set of data associated with the first page and with a second subset of planes of the plurality of planes, the obtaining the first set of data including loading the first set of data into a first subset of a first set of latches and the second set of data into a second subset of the first set of latches. The operations of 810 may be performed in accordance with examples as disclosed herein. In some examples, aspects of the operations of 810 may be performed by a reader 545 as described with reference to FIG. 5.

At 815, the method may include receiving a command to transmit the first page. The operations of 815 may be performed in accordance with examples as disclosed herein. In some examples, aspects of the operations of 815 may be performed by a receiver 525 as described with reference to FIG. 5.

At 820, the method may include transferring the first set of data from the first subset of the first set of latches to a first subset of a second set of latches and the second set of data from the second subset of the first set of latches to a second subset of a second set of latches. The operations of 820 may be performed in accordance with examples as disclosed herein. In some examples, aspects of the operations of 820 may be performed by a latch manager 535 as described with reference to FIG. 5.

At 825, the method may include transmitting, over a first duration and in response to receiving the command to transmit the first page, the first set of data from the first subset of the second set of latches. The operations of 825 may be performed in accordance with examples as disclosed herein. In some examples, aspects of the operations of 825 may be performed by a transmitter 550 as described with reference to FIG. 5.

At 830, the method may include transmitting, over a second duration, the second set of data from the second subset of the second set of latches. The operations of 830 may be performed in accordance with examples as disclosed herein. In some examples, aspects of the operations of 830 may be performed by a transmitter 550 as described with reference to FIG. 5.

At 835, the method may include obtaining, from the memory of the memory device after transferring the first and second sets of data from the first and second subsets of the first set of latches to the first and second subsets of the second set of latches, a third set of data associated with a second page of the plurality of pages and with the first subset of planes and a fourth set of data associated with the second page and with the second subset of planes, where the obtaining the third set of data includes loading the third set of data into the first subset of the first set of latches and the second subset of planes, and the fourth set of data into the second subset of the first set of latches. The operations of 835 may be performed in accordance with examples as disclosed herein. In some examples, aspects of the operations of 835 may be performed by a reader 545 as described with reference to FIG. 5.

At 840, the method may include transferring, during the second duration, the third set of data from the first subset of the first set of latches to the first subset of the second set of latches. The operations of 840 may be performed in accordance with examples as disclosed herein. In some examples, aspects of the operations of 840 may be performed by a latch manager 535 as described with reference to FIG. 5.

At 845, the method may include receiving a command to transmit the second page. The operations of 845 may be performed in accordance with examples as disclosed herein. In some examples, aspects of the operations of 845 may be performed by a receiver 525 as described with reference to FIG. 5.

At 850, the method may include transmitting, over a third duration, the third set of data from the first subset of the second set of latches. The operations of 850 may be performed in accordance with examples as disclosed herein. In some examples, aspects of the operations of 850 may be performed by a transmitter 550 as described with reference to FIG. 5.

At 855, the method may include transferring, during the third duration, the fourth set of data from the second subset of the first set of latches to the second subset of the second set of latches. The operations of 855 may be performed in accordance with examples as disclosed herein. In some examples, aspects of the operations of 855 may be performed by a latch manager 535 as described with reference to FIG. 5.

At 860, the method may include transmitting, over a fourth duration, the fourth set of data from the second subset of the second set of latches. The operations of 860 may be performed in accordance with examples as disclosed herein. In some examples, aspects of the operations of 860 may be performed by a transmitter 550 as described with reference to FIG. 5.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, at a memory device, a read memory command associated with a plurality of pages and a plurality of planes; obtaining, from memory of the memory device, a first set of data associated with a first page of the plurality of pages and with a first subset of planes of the plurality of planes, and a second set of data associated with the first page and with a second subset of planes of the plurality of planes, the obtaining the first set of data including loading the first set of data into a first subset of a first set of latches and the second set of data into a second subset of the first set of latches; receiving a command to transmit the first page; transferring the first set of data from the first subset of the first set of latches to a first subset of a second set of latches and the second set of data from the second subset of the first set of latches to a second subset of a second set of latches; transmitting, over a first duration and in response to receiving the command to transmit the first page, the first set of data from the first subset of the second set of latches; transmitting, over a second duration, the second set of data from the second subset of the second set of latches; obtaining, from the memory of the memory device after transferring the first and second sets of data from the first and second subsets of the first set of latches to the first and second subsets of the second set of latches, a third set of data associated with a second page of the plurality of pages and with the first subset of planes and a fourth set of data associated with the second page and with the second subset of planes, where the obtaining the third set of data includes loading the third set of data into the first subset of the first set of latches and the second subset of planes, and the fourth set of data into the second subset of the first set of latches; transferring, during the second duration, the third set of data from the first subset of the first set of latches to the first subset of the second set of latches; receiving a command to transmit the second page; transmitting, over a third duration, the third set of data from the first subset of the second set of latches; transferring, during the third duration, the fourth set of data from the second subset of the first set of latches to the second subset of the second set of latches; and transmitting, over a fourth duration, the fourth set of data from the second subset of the second set of latches.

Aspect 15: The method, apparatus, or non-transitory computer-readable medium of aspect 14, where the third duration is directly sequential to the second duration.

Aspect 16: The method, apparatus, or non-transitory computer-readable medium of any of aspects 14 through 15, where the memory device includes an indicator indicating one of the first subset of planes or the second subset of planes and the method, apparatuses, and non-transitory computer-readable medium further includes operations, features, circuitry, logic, means, or instructions, or any combination thereof for determining that the indicator indicates the first subset of planes, where transferring the third set of data to the first subset of the second set of latches is based at least in part on determining that the indicator indicates the first subset of planes and determining that the indicator indicates the second subset of planes, where transferring the fourth set of data to the second subset of the second set of latches is based at least in part on determining that the indicator indicates the second subset of planes.

Aspect 17: The method, apparatus, or non-transitory computer-readable medium of aspect 16, where the method, apparatuses, and non-transitory computer-readable medium further includes operations, features, circuitry, logic, means, or instructions, or any combination thereof for receiving a command to change planes; setting the indicator to indicate the first subset of planes based at least in part on the indicator indicating the second subset of planes when receiving the command to change planes, where determining that the indicator indicates the first subset of planes is based at least in part on setting the indicator to indicate the first subset of planes; and setting the indicator to indicate the second subset of planes based at least in part on the indicator indicating the first subset of planes when receiving the command to change planes, where determining that the indicator indicates the second subset of planes is based at least in part on setting the indicator to indicate the second subset of planes.

Aspect 18: The method, apparatus, or non-transitory computer-readable medium of any of aspects 16 through 17, further including operations, features, circuitry, logic, means, or instructions, or any combination thereof for changing the indicator to indicate the second subset of planes after transferring the first set of data to the first subset of the second set of latches and changing the indicator to indicate the first subset of planes after transferring the second set of data to the second subset of the second set of latches.

Aspect 19: The method, apparatus, or non-transitory computer-readable medium of any of aspects 14 through 18, further including operations, features, circuitry, logic, means, or instructions, or any combination thereof for receiving a first indication indicating the first subset of planes, where transferring the third set of data to the first subset of the second set of latches is based at least in part on determining that an indicator indicates the first subset of planes and receiving a second indication indicating the second subset of planes, where transferring the fourth set of data to the second subset of the second set of latches is based at least in part on determining that the indicator indicates the second subset of planes.

Aspect 20: The method, apparatus, or non-transitory computer-readable medium of aspect 19, where receiving the first indication includes receiving a first command to trigger a first data transfer using the first subset of planes, where transferring the first set of data to the first subset of the second set of latches is based at least in part on receiving the first command and receiving the second indication includes receiving a second command to trigger a second data transfer using the second subset of planes, where transferring the second set of data to the second subset of the second set of latches is based at least in part on receiving the second command.

Aspect 21: The method, apparatus, or non-transitory computer-readable medium of any of aspects 14 through 20, where transferring the third set of data to the first subset of the second set of latches includes operations, features, circuitry, logic, means, or instructions, or any combination thereof for overwriting the first set of data in the first subset of the second set of latches with the third set of data.

Aspect 22: The method, apparatus, or non-transitory computer-readable medium of any of aspects 14 through 21, where the first and second pages correspond to pages of multi-level cells of the memory device.

Aspect 23: The method, apparatus, or non-transitory computer-readable medium of any of aspects 14 through 22, where the first subset of planes and the second subset of planes are disjoint subsets that each include at least two planes.

Figure 9:
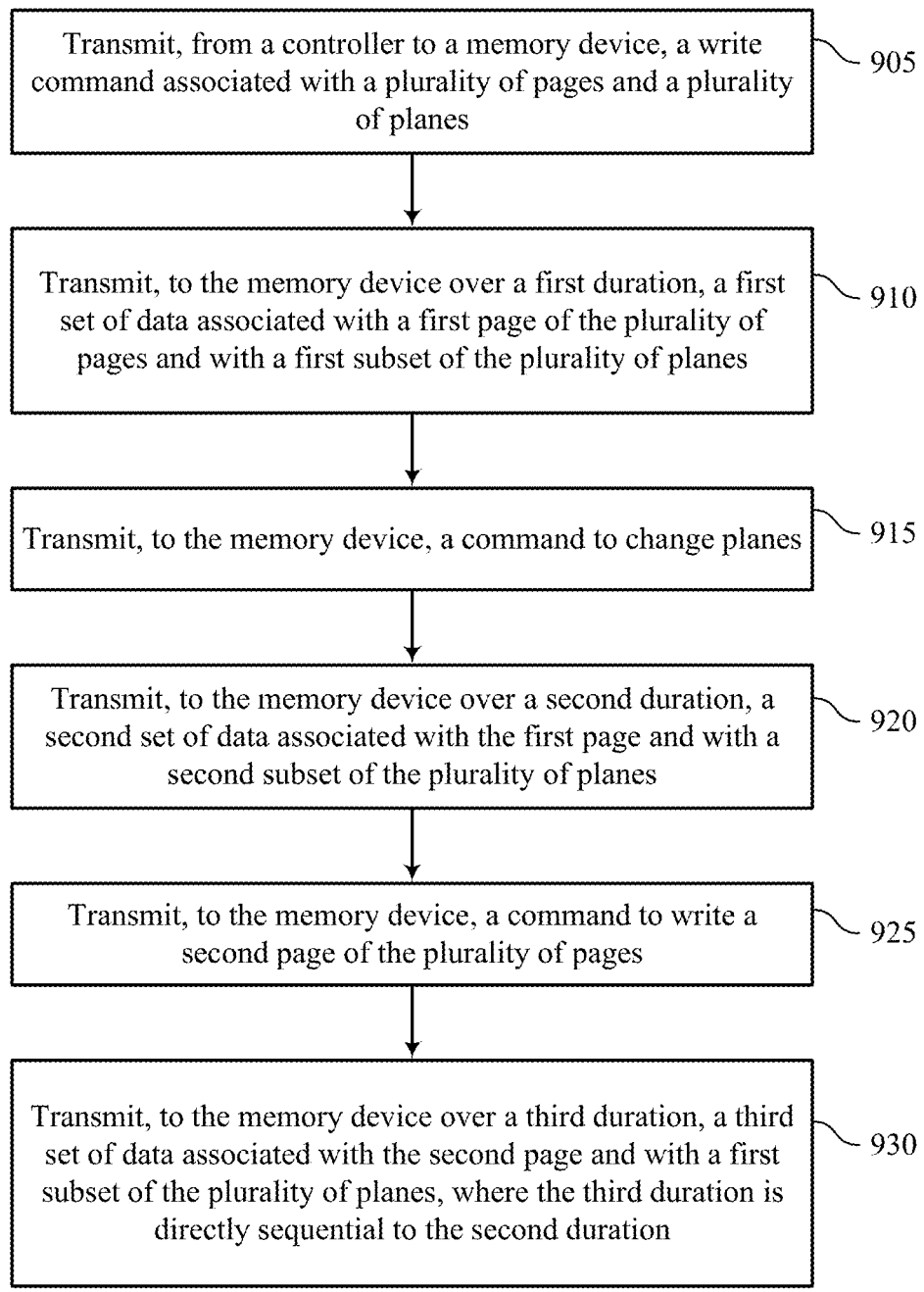

FIG. 9 shows a flowchart illustrating a method 900 that supports multi-plane cache transfer enhancement in accordance with examples as disclosed herein. The operations of method 900 may be implemented by a memory system or its components as described herein. For example, the operations of method 900 may be performed by a memory system as described with reference to FIGS. 1 through 4 and 6. In some examples, a memory system may execute a set of instructions to control the functional elements of the device to perform the described functions. Additionally, or alternatively, the wireless memory system may perform aspects of the described functions using special-purpose hardware.

At 905, the method may include transmitting, from a controller to a memory device, a write command associated with a plurality of pages and a plurality of planes. The operations of 905 may be performed in accordance with examples as disclosed herein. In some examples, aspects of the operations of 905 may be performed by a transmitter 625 as described with reference to FIG. 6.

At 910, the method may include transmitting, to the memory device over a first duration, a first set of data associated with a first page of the plurality of pages and with a first subset of the plurality of planes. The operations of 910 may be performed in accordance with examples as disclosed herein. In some examples, aspects of the operations of 910 may be performed by a transmitter 625 as described with reference to FIG. 6.

At 915, the method may include transmitting, to the memory device, a command to change planes. The operations of 915 may be performed in accordance with examples as disclosed herein. In some examples, aspects of the operations of 915 may be performed by a transmitter 625 as described with reference to FIG. 6.

At 920, the method may include transmitting, to the memory device over a second duration, a second set of data associated with the first page and with a second subset of the plurality of planes. The operations of 920 may be performed in accordance with examples as disclosed herein. In some examples, aspects of the operations of 920 may be performed by a transmitter 625 as described with reference to FIG. 6.

At 925, the method may include transmitting, to the memory device, a command to write a second page of the plurality of pages. The operations of 925 may be performed in accordance with examples as disclosed herein. In some examples, aspects of the operations of 925 may be performed by a transmitter 625 as described with reference to FIG. 6.

At 930, the method may include transmitting, to the memory device over a third duration, a third set of data associated with the second page and with a first subset of the plurality of planes, where the third duration is directly sequential to the second duration. The operations of 930 may be performed in accordance with examples as disclosed herein. In some examples, aspects of the operations of 930 may be performed by a transmitter 625 as described with reference to FIG. 6.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 24: A method, apparatus, or non-transitory computer-readable medium including operations, features, circuitry, logic, means, or instructions, or any combination thereof for transmitting, from a controller to a memory device, a write command associated with a plurality of pages and a plurality of planes; transmitting, to the memory device over a first duration, a first set of data associated with a first page of the plurality of pages and with a first subset of the plurality of planes; transmitting, to the memory device, a command to change planes; transmitting, to the memory device over a second duration, a second set of data associated with the first page and with a second subset of the plurality of planes; transmitting, to the memory device, a command to write a second page of the plurality of pages; and transmitting, to the memory device over a third duration, a third set of data associated with the second page and with the first subset of the plurality of planes, where the third duration is directly sequential to the second duration.

Aspect 25: The method, apparatus, or non-transitory computer-readable medium of aspect 24, further including operations, features, circuitry, logic, means, or instructions, or any combination thereof for transmitting, to the memory device during the third duration, a second command to change planes and transmitting, to the memory device over a fourth duration, a fourth set of data associated with the second page, where the fourth duration is directly sequential to the third duration.

Aspect 26: The method, apparatus, or non-transitory computer-readable medium of any of aspects 24 through 25, where the first subset of the plurality of planes and the second subset of the plurality of planes are disjoint subsets that each include at least two planes.

Figure 10:
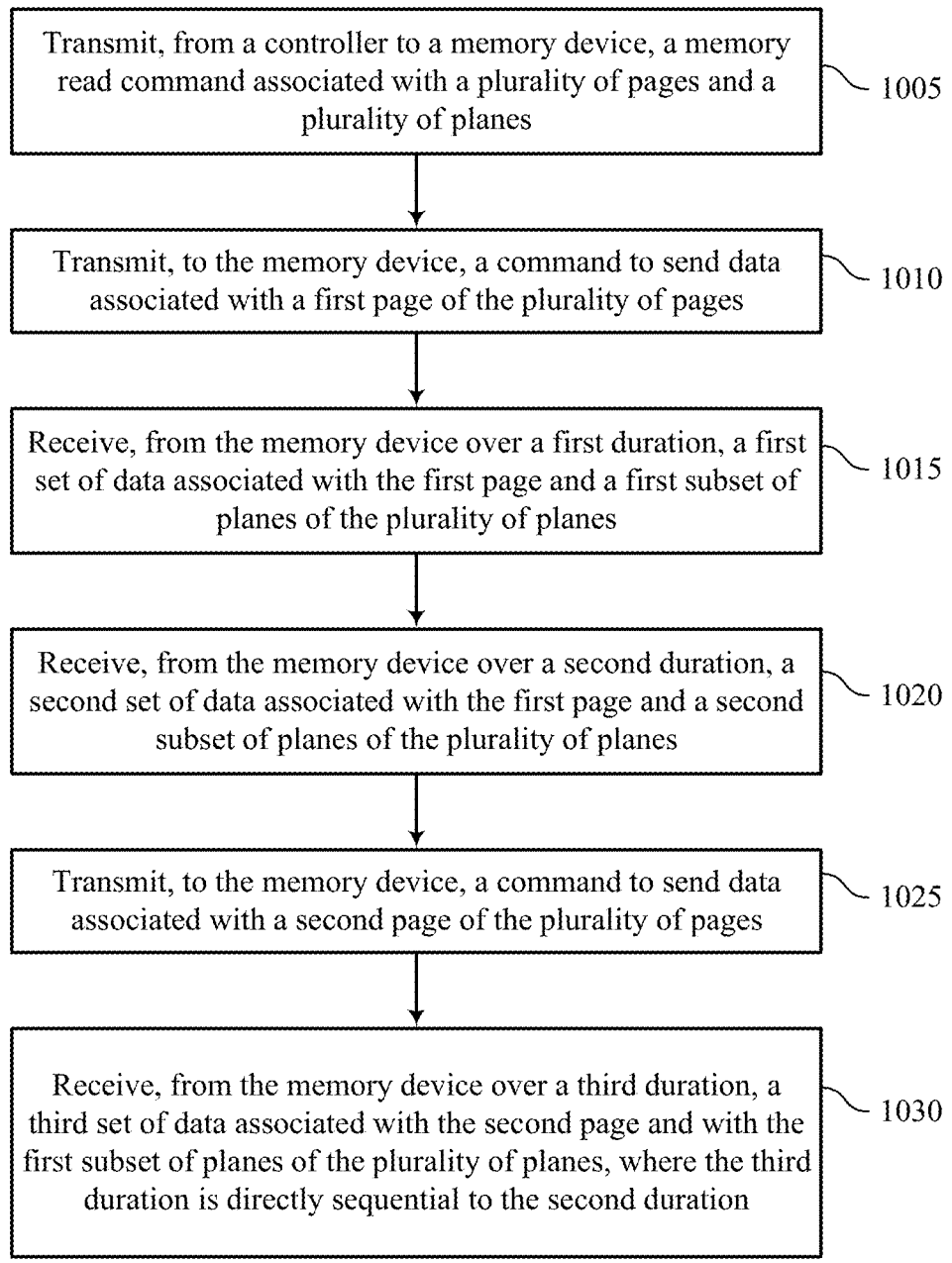

FIG. 10 shows a flowchart illustrating a method 1000 that supports multi-plane cache transfer enhancement in accordance with examples as disclosed herein. The operations of method 1000 may be implemented by a memory system or its components as described herein. For example, the operations of method 1000 may be performed by a memory system as described with reference to FIGS. 1 through 4 and 6. In some examples, a memory system may execute a set of instructions to control the functional elements of the device to perform the described functions. Additionally, or alternatively, the wireless memory system may perform aspects of the described functions using special-purpose hardware.

At 1005, the method may include transmitting, from a controller to a memory device, a memory read command associated with a plurality of pages and a plurality of planes. The operations of 1005 may be performed in accordance with examples as disclosed herein. In some examples, aspects of the operations of 1005 may be performed by a transmitter 625 as described with reference to FIG. 6.

At 1010, the method may include transmitting, to the memory device, a command to send data associated with a first page of the plurality of pages. The operations of 1010 may be performed in accordance with examples as disclosed herein. In some examples, aspects of the operations of 1010 may be performed by a transmitter 625 as described with reference to FIG. 6.

At 1015, the method may include receiving, from the memory device over a first duration, a first set of data associated with the first page and a first subset of planes of the plurality of planes. The operations of 1015 may be performed in accordance with examples as disclosed herein. In some examples, aspects of the operations of 1015 may be performed by a receiver 630 as described with reference to FIG. 6.

At 1020, the method may include receiving, from the memory device over a second duration, a second set of data associated with the first page and a second subset of planes of the plurality of planes. The operations of 1020 may be performed in accordance with examples as disclosed herein. In some examples, aspects of the operations of 1020 may be performed by a receiver 630 as described with reference to FIG. 6.

At 1025, the method may include transmitting, to the memory device, a command to send data associated with a second page of the plurality of pages. The operations of 1025 may be performed in accordance with examples as disclosed herein. In some examples, aspects of the operations of 1025 may be performed by a transmitter 625 as described with reference to FIG. 6.

At 1030, the method may include receiving, from the memory device over a third duration, a third set of data associated with the second page and with the first subset of planes of the plurality of planes, where the third duration is directly sequential to the second duration. The operations of 1030 may be performed in accordance with examples as disclosed herein. In some examples, aspects of the operations of 1030 may be performed by a receiver 630 as described with reference to FIG. 6.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 27: A method, apparatus, or non-transitory computer-readable medium including operations, features, circuitry, logic, means, or instructions, or any combination thereof for transmitting, from a controller to a memory device, a memory read command associated with a plurality of pages and a plurality of planes; transmitting, to the memory device, a command to send data associated with a first page of the plurality of pages; receiving, from the memory device over a first duration, a first set of data associated with the first page and a first subset of planes of the plurality of planes; receiving, from the memory device over a second duration, a second set of data associated with the first page and a second subset of planes of the plurality of planes; transmitting, to the memory device, a command to send data associated with a second page of the plurality of pages; and receiving, from the memory device over a third duration, a third set of data associated with the second page and with the first subset of planes of the plurality of planes, where the third duration is directly sequential to the second duration.

Aspect 28: The method, apparatus, or non-transitory computer-readable medium of aspect 28, further including operations, features, circuitry, logic, means, or instructions, or any combination thereof for transmitting, to the memory device during the third duration, a command to change planes and receiving, from the memory device over a fourth duration, a fourth set of data associated with the second page and the second subset of planes of the plurality of planes, where the fourth duration is directly sequential to the third duration.

Aspect 29: The method, apparatus, or non-transitory computer-readable medium of any of aspects 27 through 28, where the first subset of planes and the second subset of planes are disjoint subsets that each include at least two planes.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:
   a plurality of planes comprising a first subset of planes and a second subset of planes;
   a plurality of latches comprising a first set of latches and a second set of latches; and
   a controller coupled with the plurality of planes and the plurality of latches and configured to cause the memory device to:
      receive, at the memory device, a write command associated with a plurality of pages and the plurality of planes;
      load, over a first duration, a first set of data associated with a first page of the plurality of pages and with the first subset of planes into a first subset of the first set of latches;
      load, over a second duration, a second set of data associated with the first page and with the second subset of planes into a second subset of the first set of latches;
      transfer, during the second duration, the first set of data from the first subset of the first set of latches to a first subset of the second set of latches;
      load, over a third duration, a third set of data associated with a second page of the plurality of pages and with the first subset of planes into the first subset of the first set of latches;
      transfer, during the third duration, the second set of data from the second subset of the first set of latches to a second subset of the second set of latches;
      load, over a fourth duration, a fourth set of data associated with the second page and the second subset of planes into the second subset of the first set of latches; and
      program the first, second, third, and fourth sets of data to memory cells of the memory device.

2. The memory device of claim 1, wherein the third duration is directly sequential to the second duration.

3. The memory device of claim 1, further comprising:
   an indicator indicating one of the first subset of planes or the second subset of planes,
   wherein the controller is further configured to cause the memory device to:
      determine that the indicator indicates the first subset of planes, wherein loading the first set of data into the first subset of the first set of latches and loading the second set of data into the first subset of the first set of latches are based at least in part on determining that the indicator indicates the first subset of planes; and
      determine that the indicator indicates the second subset of planes, wherein loading the third set of data into the second subset of the first set of latches and loading the fourth set of data into the second subset of the first set of latches are based at least in part on determining that the indicator indicates the second subset of planes.

4. The memory device of claim 3, wherein the controller is further configured to cause the memory device to:
   set the indicator to indicate the first subset of planes based at least in part on receiving the write command, wherein determining that the indicator indicates the first subset of planes is based at least in part on setting the indicator to indicate the first subset of planes;
   receive a second command to change planes; and
   set the indicator to indicate the second subset of planes based at least in part on the indicator indicating the first subset of planes when receiving the second command, wherein determining that the indicator indicates the second subset of planes is based at least in part on setting the indicator to indicate the second subset of planes.

5. The memory device of claim 3, wherein the controller is further configured to cause the memory device to:
   change the indicator to indicate the second subset of planes after loading the second set of data into the first subset of the first set of latches; and
   change the indicator to indicate the first subset of planes after loading the fourth set of data into the second subset of the first set of latches.

6. The memory device of claim 1, wherein the controller is further configured to cause the memory device to:
   receive a first indication in conjunction with the first and second sets of data, the first indication indicating the first subset of planes, wherein loading the first set of data into the first subset of the first set of latches and loading the second set of data into the first subset of the first set of latches are based at least in part on receiving the first indication; and
   receive a second indication in conjunction with the third and fourth sets of data, the second indication indicating the second subset of planes, wherein loading the third set of data into the second subset of the first set of latches and loading the fourth set of data into the second subset of the first set of latches are based at least in part on receiving the second indication.

7. The memory device of claim 6, wherein:
   to receive the first indication, the controller is configured to cause the memory device to receive a first command to trigger a first data transfer using the first subset of planes, wherein loading the first set of data into the first subset of the first set of latches and loading the second set of data into the first subset of the first set of latches are based at least in part on receiving the first command; and
   to receive the second indication, the controller is further configured to cause the memory device to receive a second command to trigger a second data transfer using the second subset of planes, wherein loading the third set of data into the second subset of the first set of latches and loading the fourth set of data into the second subset of the first set of latches are based at least in part on receiving the second command.

8. The memory device of claim 1, wherein the plurality of latches further comprises a third set of latches,
   wherein the controller is further configured to cause the memory device to:
      transfer, during the fourth duration, the third set of data from the first subset of the first set of latches to a first subset of the third set of latches.

9. The memory device of claim 8, wherein the controller is further configured to cause the memory device to:
   transfer, after the fourth duration, the fourth set of data from the second subset of the first set of latches to a second subset of the third set of latches, wherein programming the first, second, third, and fourth sets of data is based at least in part on transferring the fourth set of data to the second subset of the third set of latches.

10. The memory device of claim 9, wherein to program the first, second, third, and fourth sets of data to the memory cells, the controller is further configured to cause the memory device to:
 program the first, second, third, and fourth sets of data using the first and second sets of data loaded in the first and second subsets of the second set of latches, and the third and fourth sets of data loaded in the first and second subsets of the third set of latches.

11. The memory device of claim 8,
wherein the controller is further configured to cause the memory device to:
 load, over a fifth duration, a fifth set of data associated with a third page of the plurality of pages and the first subset of planes into the first subset of the first set of latches, wherein loading the fifth set of data is based at least in part on transferring the third set of data to the first subset of the third set of latches;
 transfer, during the fifth duration, the fourth set of data from the second subset of the first set of latches to a second subset of the third set of latches;
 load, during a sixth duration, a sixth set of data associated with the third page and the second subset of planes into the second subset of the first set of latches;
 transfer, during the sixth duration, the fifth set of data from the first subset of the first set of latches to a first subset of the fourth set of latches;
 transfer, after the sixth duration, the sixth set of data from the second subset of the first set of latches to a second subset of the fourth set of latches; and
 program the fifth and sixth sets of data to memory cells of the memory device.

12. The memory device of claim 1, wherein the first and second pages correspond to pages of multi-level cells of the memory device.

13. The memory device of claim 1, wherein the first subset of planes and the second subset of planes are disjoint subsets that each include at least two planes.

14. A memory device, comprising:
 a plurality of planes comprising a first subset of planes and a second subset of planes;
 a plurality of latches comprising a first set of latches and a second set of latches; and
 a controller coupled with the plurality of planes and the plurality of latches and configured to cause the memory device to:
  receive, at the memory device, a read memory command associated with a plurality of pages and the plurality of planes;
  obtain, from memory of the memory device, a first set of data associated with a first page of the plurality of pages and with the first subset of planes, and a second set of data associated with the first page and with the second subset of planes, the obtaining the first set of data comprising loading the first set of data into a first subset of the first set of latches and the second set of data into a second subset of the first set of latches;
  receive a command to transmit the first page;
  transfer the first set of data from the first subset of the first set of latches to a first subset of the second set of latches and the second set of data from the second subset of the first set of latches to a second subset of the second set of latches;
  transmit, over a first duration and in response to receiving the command to transmit the first page, the first set of data from the first subset of the second set of latches;
  transmit, over a second duration, the second set of data from the second subset of the second set of latches;
  obtain, from the memory of the memory device after transferring the first and second sets of data from the first and second subsets of the first set of latches to the first and second subsets of the second set of latches, a third set of data associated with a second page of the plurality of pages and with the first subset of planes and a fourth set of data associated with the second page and with the second subset of planes, wherein the obtaining the third set of data comprises loading the third set of data into the first subset of the first set of latches and the second subset of planes, and the fourth set of data into the second subset of the first set of latches;
  transfer, during the second duration, the third set of data from the first subset of the first set of latches to the first subset of the second set of latches;
  receiving a command to transmit the second page;
  transmit, over a third duration, the third set of data from the first subset of the second set of latches;
  transferring, during the third duration, the fourth set of data from the second subset of the first set of latches to the second subset of the second set of latches; and
  transmit, over a fourth duration, the fourth set of data from the second subset of the second set of latches.

15. The memory device of claim 14, wherein the third duration is directly sequential to the second duration.

16. The memory device of claim 14, further comprising:
 an indicator indicating one of the first subset of planes or the second subset of planes,
 wherein the controller is further configured to cause the memory device to:
  determine that the indicator indicates the first subset of planes, wherein transferring the third set of data to the first subset of the second set of latches is based at least in part on determining that the indicator indicates the first subset of planes; and
  determine that the indicator indicates the second subset of planes, wherein transferring the fourth set of data to the second subset of the second set of latches is based at least in part on determining that the indicator indicates the second subset of planes.

17. The memory device of claim 16, wherein the controller is further configured to cause the memory device to:
 receive a command to change planes;
 set the indicator to indicate the first subset of planes based at least in part on the indicator indicating the second subset of planes when receiving the command to change planes, wherein determining that the indicator indicates the first subset of planes is based at least in part on setting the indicator to indicate the first subset of planes; and
 set the indicator to indicate the second subset of planes based at least in part on the indicator indicating the first subset of planes when receiving the command to change planes, wherein determining that the indicator indicates the second subset of planes is based at least in part on setting the indicator to indicate the second subset of planes.

18. The memory device of claim 16, wherein the controller is further configured to cause the memory device to:

change the indicator to indicate the second subset of planes after transferring the first set of data to the first subset of the second set of latches; and change the indicator to indicate the first subset of planes after transferring the second set of data to the second subset of the second set of latches.

19. The memory device of claim 14, wherein the controller is further configured to cause the memory device to:

receive a first indication indicating the first subset of planes, wherein transferring the third set of data to the first subset of the second set of latches is based at least in part on determining that an indicator indicates the first subset of planes; and receive a second indication indicating the second subset of planes, wherein transferring the fourth set of data to the second subset of the second set of latches is based at least in part on determining that the indicator indicates the second subset of planes.

20. The memory device of claim 19, wherein:

to receive the first indication, the controller is further configured to cause the memory device to receive a first command to trigger a first data transfer using the first subset of planes, wherein transferring the first set of data to the first subset of the second set of latches is based at least in part on receiving the first command; and to receive the second indication, the controller is further configured to cause the memory device to receive a second command to trigger a second data transfer using the second subset of planes, wherein transferring the second set of data to the second subset of the second set of latches is based at least in part on receiving the second command.

21. The memory device of claim 14, wherein to transfer the third set of data to the first subset of the second set of latches, the controller is further configured to cause the memory device to:

overwrite the first set of data in the first subset of the second set of latches with the third set of data.

22. The memory device of claim 14, wherein the first and second pages correspond to pages of multi-level cells of the memory device.

23. The memory device of claim 14, wherein the first subset of planes and the second subset of planes are disjoint subsets that each include at least two planes.

24. An apparatus, comprising:

a controller configured to couple with a memory device, wherein the controller is configured to cause the apparatus to:

transmit, to the memory device, a write command associated with a plurality of pages and a plurality of planes;

transmit, to the memory device over a first duration, a first set of data associated with a first page of the plurality of pages and with a first subset of the plurality of planes;

transmit, to the memory device, a command to change planes;

transmit, to the memory device over a second duration, a second set of data associated with the first page and with a second subset of the plurality of planes;

transmit, to the memory device, a command to write a second page of the plurality of pages; and transmit, to the memory device over a third duration, a third set of data associated with the second page and with the first subset of the plurality of planes, wherein the third duration is directly sequential to the second duration.

25. The apparatus of claim 24, wherein the controller is further configured to cause the apparatus to:

transmit, to the memory device during the third duration, a second command to change planes; and transmit, to the memory device over a fourth duration, a fourth set of data associated with the second page, wherein the fourth duration is directly sequential to the third duration.

26. The apparatus of claim 24, wherein the first subset of the plurality of planes and the second subset of the plurality of planes are disjoint subsets that each include at least two planes.

27. An apparatus, comprising:

a controller configured to couple with a memory device, wherein the controller is configured to cause the apparatus to:

transmit, to the memory device, a memory read command associated with a plurality of pages and a plurality of planes;

transmit, to the memory device, a command to send data associated with a first page of the plurality of pages;

receive, from the memory device over a first duration, a first set of data associated with the first page and a first subset of planes of the plurality of planes;

receive, from the memory device over a second duration, a second set of data associated with the first page and a second subset of planes of the plurality of planes;

transmit, to the memory device, a command to send data associated with a second page of the plurality of pages; and receive, from the memory device over a third duration, a third set of data associated with the second page and with the first subset of planes of the plurality of planes, wherein the third duration is directly sequential to the second duration.

28. The apparatus of claim 27, wherein the controller is further configured to cause the apparatus to:

transmit, to the memory device during the third duration, a command to change planes; and receive, from the memory device over a fourth duration, a fourth set of data associated with the second page and the second subset of planes of the plurality of planes, wherein the fourth duration is directly sequential to the third duration.

29. The apparatus of claim 27, wherein the first subset of planes and the second subset of planes are disjoint subsets that each include at least two planes.

* * * * *